United States Patent
Shiraiwa et al.

(10) Patent No.: US 12,359,054 B2
(45) Date of Patent: Jul. 15, 2025

(54) CURABLE RESIN COMPOSITION FOR LENS, CURED PRODUCT, DIFFRACTIVE OPTICAL ELEMENT, AND MULTILAYER DIFFRACTIVE OPTICAL ELEMENT

(71) Applicant: FUJIFILM Corporation, Tokyo (JP)

(72) Inventors: Naozumi Shiraiwa, Kanagawa (JP); Naoyuki Morooka, Kanagawa (JP); Daisuke Sasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 475 days.

(21) Appl. No.: 17/889,928

(22) Filed: Aug. 17, 2022

(65) Prior Publication Data

US 2023/0096868 A1 Mar. 30, 2023

(30) Foreign Application Priority Data

Sep. 17, 2021 (JP) .................. 2021-152493

(51) Int. Cl.
*C08L 33/12* (2006.01)
*C09B 47/00* (2006.01)
*G02B 27/42* (2006.01)

(52) U.S. Cl.
CPC .............. *C08L 33/12* (2013.01); *C09B 47/00* (2013.01); *G02B 27/4205* (2013.01)

(58) Field of Classification Search
CPC ..... C08L 33/12; C09B 47/00; C09B 67/0084; G02B 27/4205; G02B 1/041; G02B 5/1814; G02B 5/1876
See application file for complete search history.

(56) References Cited

U.S. PATENT DOCUMENTS

| 7,506,977 | B1 * | 3/2009 | Aiiso | C09B 47/04 |
| | | | | 351/44 |
| 9,017,820 | B2 * | 4/2015 | Tamura | G02C 7/12 |
| | | | | 351/44 |
| 10,954,341 | B2 * | 3/2021 | Kakinuma | C08G 75/02 |
| 12,117,589 | B2 * | 10/2024 | Aiiso | B29D 11/00413 |
| 2013/0155507 | A1 * | 6/2013 | Ryu | G02B 5/3033 |
| | | | | 264/1.32 |
| 2022/0089867 | A1 * | 3/2022 | Kosaka | C08K 5/3465 |
| 2022/0187628 | A1 * | 6/2022 | Valentine | C09B 5/00 |

FOREIGN PATENT DOCUMENTS

| JP | 2021107486 A | * | 7/2021 |
| WO | 2020/171197 A1 | | 8/2020 |

OTHER PUBLICATIONS

Communication dated Feb. 18, 2025 issued in Japanese Application No. 2021-152493.

* cited by examiner

*Primary Examiner* — Collin X Beatty
(74) *Attorney, Agent, or Firm* — Sughrue Mion, PLLC

(57) ABSTRACT

A curable resin composition for a lens, including a coloring agent A having a maximal absorption at a wavelength of 520 to 620 nm, in which a wavelength dispersion WD of a cured product of the composition, which is calculated by the following expression (X), is $2.0 \times 10^{-5}$ or more; a cured product formed of the curable resin composition for a lens; a diffractive optical element; and a multilayer diffractive optical element.

$$WD = (nC - n(1129))/(1129 - 656) \qquad \text{Expression (X)}$$

In the expression, nC represents a refractive index at a wavelength of 656 nm and n(1129) represents a refractive index at a wavelength of 1129 nm.

7 Claims, No Drawings

CURABLE RESIN COMPOSITION FOR LENS, CURED PRODUCT, DIFFRACTIVE OPTICAL ELEMENT, AND MULTILAYER DIFFRACTIVE OPTICAL ELEMENT

CROSS-REFERENCE TO RELATED APPLICATIONS

This application claims priorities under 35 U.S.C. § 119 (a) to Japanese Patent Application No. 2021-152493 filed in Japan on Sep. 17, 2021. The above application is hereby expressly incorporated by reference, in its entirety, into the present application.

BACKGROUND OF THE INVENTION

1. Field of the Invention

The present invention relates to a curable resin composition for a lens.

The present invention also relates to a cured product obtained using the curable resin composition for a lens, a diffractive optical element, and a multilayer diffractive optical element.

2. Description of the Related Art

By using a diffractive optical element, it is possible to obtain a lens which has a shorter focal length as the wavelength is longer, and exhibits chromatic aberration opposite to that of a refractive lens in the related art. Unlike the refractive lens requiring a plurality of lenses for correcting chromatic aberration, chromatic aberration can be corrected by changing the period of a diffraction structure of a lens, therefore a more compact and high-performance lens unit can be designed by using the diffractive optical element.

In a multilayer diffractive optical element having a configuration in which diffractive optical elements formed of two different materials are in contact with each other on lattice planes thereof, by forming one diffractive optical element with a material having a relatively high refractive index and high Abbe number, and forming the other diffractive optical element with a material having a relatively low refractive index and low Abbe number, it is possible to suppress the occurrence of flare in the lens, and the like, and sufficiently utilize a chromatic aberration reducing effect. In this case, in a case where the two diffractive optical elements have optical characteristics in which the difference in refractive index between the two diffractive optical elements is larger at a longer wavelength, the chromatic aberration reducing effect can be obtained in a wide wavelength range.

In recent years, in order to obtain, as described above, the chromatic aberration reducing effect in a wide wavelength range, it has been proposed to add indium tin oxide (ITO) particles to a low Abbe number diffractive optical element in the multilayer diffractive optical element. For example, WO2020/171197A discloses a resin composition including ITO particles and a near-ultraviolet light-absorbing organic compound. It is disclosed that, with this resin composition, a cured product, in which a wavelength dependence of a refractive index is adjusted by improving the refractive index on the short wavelength side, and a desired low refractive index and low Abbe number is achieved while suppressing a blending amount of the ITO particles and increasing transmittance in a near infrared wavelength region, is obtained.

SUMMARY OF THE INVENTION

In the related art, since a general digital camera or the like is supposed to be applied to a lens using a diffractive optical element, as disclosed in JWO2020/171197A, development has been conducted to obtain a low Abbe number diffractive optical element which has a high wavelength dependence (high wavelength dispersibility) of a refractive index and high transmittance in the visible light wavelength region, visible to humans, or the near infrared wavelength region of approximately 1.0 µm from visible light.

However, in recent years, the required level of resolution of surveillance camera lenses has been increased, and a diffractive optical element corresponding to a wavelength region of approximately 1.0 to 1.7 µm as a wavelength region from near-infrared to shortwave infrared (hereinafter, also referred to as a "wavelength region from NIR to SWIR" in the present invention) has been required. Therefore, in order to obtain chromatic aberration reducing effect in the wavelength region from NIR to SWIR to the applied lens, in this wavelength region, a diffractive optical element having a wavelength dependence of a refractive index and a high transmittance, which is desired as a high wavelength dispersion diffractive optical element, has been required. However, according to the study by the present inventors, it has been found that, since the technique described in WO2020/171197A uses the near-ultraviolet light-absorbing organic compound and ITO particles having an absorption at 1750 nm, the wavelength dispersibility and transmittance are low in the wavelength region from NIR to SWIR, and it is difficult to realize high wavelength dispersibility and high transmittance in this wavelength region.

An object of the present invention is to provide a curable resin composition for a lens, in which a wavelength dependence of a refractive index can be controlled to a desired level over a wavelength region from near-infrared to shortwave infrared and with which a cured product exhibiting high transmittance in this wavelength region can be obtained. Another object of the present invention is to provide a cured product obtained from the curable resin composition for a lens, and a diffractive optical element and a multilayer diffractive optical element including the cured product.

The above-described objects have been achieved by the following methods.

[1]

A curable resin composition for a lens, comprising:
  a coloring agent A having a maximal absorption at a wavelength of 520 to 620 nm,
  in which a wavelength dispersion WD of a cured product of the composition, which is calculated by the following expression (X), is $2.0 \times 10^{-5}$ or more, $$WD = (nC - n(1129))/(1129 - 656) \qquad \text{Expression (X)}$$

in the expression, nC represents a refractive index at a wavelength of 656 nm and n(1129) represents a refractive index at a wavelength of 1129 nm.

[2]

The curable resin composition for a lens according to [1], in which the coloring agent A is a tetraazaporphyrin coloring agent.

[3]

The curable resin composition for a lens according to [2], in which the coloring agent A is a compound represented by General Formula (a), General Formula (a)

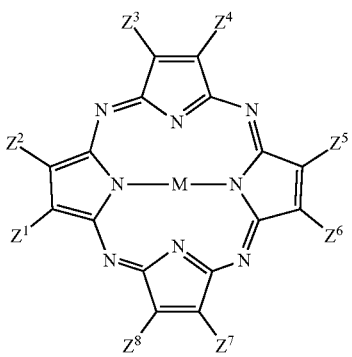

in the formula, M represents Pd, Cu, Ni, Co, or V(=O), and in each combination of $Z^1$ and $Z^2$, $Z^3$ and $Z^4$, $Z^5$ and $Z^6$, and $Z^7$ and $Z^8$ of $Z^1$ to $Z^8$, one group constituting the combination is a substituted phenyl group and the other group is a hydrocarbon group having 1 to 6 carbon atoms.

[4]

The curable resin composition for a lens according to any one of [1] to [3], further comprising:

at least one of a polyfunctional (meth)acrylate monomer or a monofunctional (meth)acrylate monomer, in which, in a case where the monofunctional (meth) acrylate monomer is a homopolymer, a glass transition temperature is 100° C. or higher.

[5]

The curable resin composition for a lens according to any one of [1] to [4], in which a content of the coloring agent A in the curable resin composition for a lens is 15% by mass or more, or the curable resin composition for a lens includes a metal oxide having a maximal absorption at a wavelength of 1900 to 4000 nm.

[6]

A cured product of the curable resin composition for a lens according to any one of [1] to [5].

[7]

A diffractive optical element comprising:

the cured product according to [6], in which the diffractive optical element includes a surface having a diffraction grating shape and formed of the cured product.

[8]

A multilayer diffractive optical element comprising:

a first diffractive optical element; and a second diffractive optical element, in which the first diffractive optical element is the diffractive optical element according to [7], and the surface of the first diffractive optical element, which has a diffraction grating shape, and a surface of the second diffractive optical element, which has a diffraction grating shape, face each other.

In the present invention, the expression of a compound and a substituent is used to include the compound itself and the substituent itself, a salt thereof, and an ion thereof. For example, a carboxy group or the like may have an ionic structure in which a hydrogen atom is dissociated, or may have a salt structure. That is, in the present invention, the "carboxy group" is used in the sense of including a carboxylic acid ion or a salt thereof. This also applies to other acidic groups. A monovalent or polyvalent cation in forming the above-described salt structure is not particularly limited, and examples thereof include inorganic cations and organic cations. In addition, specific examples thereof include alkali metal cations such as $Na^+$, $Li^+$, and $K^+$, alkaline earth metal cations such as $Mg^{2+}$, $Ca^{2+}$, and $Ba^{2+}$, and organic ammonium cations such as a trialkylammonium cation and a tetraalkylammonium cation.

In a case of the salt structure, the type of salt may be one or a mixture of two or more thereof, salt-type and liberated acid-structured groups may be mixed in a compound, or a salt-structured compound and a liberated acid-structured compound may be mixed.

In the present invention, in a case of a plurality of substituents, linking groups, constitutional units, and the like (hereinafter, referred to as a substituent and the like) represented by a specific reference or formula, or in a case of simultaneously defining a plurality of the substituent and the like, unless otherwise specified, the substituent and the like may be the same or different from each other (regardless of the presence or absence of an expression "each independently", the substituent and the like may be the same or different from each other). The same applies to the definition of the number of substituents and the like. In a case where a plurality of substituents and the like are near (particularly, adjacent to each other), unless otherwise specified, the substituents and the like may be linked to each other to form a ring. In addition, unless otherwise specified, a ring, for example, an alicyclic ring, an aromatic ring, or a heterocyclic ring may be further condensed to form a fused ring.

In the present invention, unless otherwise specified, with regard to a double bond, in a case where E-form and Z-form are present in the molecule, the double bond may be any one of these forms, or may be a mixture thereof.

In addition, in the present invention, unless otherwise specified, in a case where a compound has one or two or more asymmetric carbons, for such stereochemistry of asymmetric carbons, either an (R)-form or an (S)-form can be independently taken. As a result, the compound may be a mixture of optical isomers or steric isomers such as diastereoisomers, or may be racemic.

In addition, in the present invention, the expression of the compound means that a compound having a partially changed structure is included within a range which does not impair the effects of the present invention. Further, a compound which is not specifically described as substituted or unsubstituted may have an optional substituent within a range which does not impair the effects of the present invention.

In the present invention, with regard to a substituent (the same applies to a linking group and a ring) in which whether it is substituted or unsubstituted is not specified, within a range not impairing the desired effect, it means that the group may have an optional substituent, and the number of substituents which may be included is not particularly limited. For example, "alkyl group" means to include both an unsubstituted alkyl group and a substituted alkyl group. Similarly, "aryl group" means to include both an unsubstituted aryl group and a substituted aryl group.

In the present invention, in a case where the number of carbon atoms in a certain group is specified, the number of carbon atoms means the number of carbon atoms in the entire group, unless otherwise specified in the present invention or the present specification. That is, in a case of an aspect in which the group has a substituent, it means the total number of carbon atoms including the substituent.

In the present invention, a numerical range represented by using "to" means a range including numerical values described before and after "to" as a lower limit value and an upper limit value.

In the present invention, each component may be used alone or in combination of two or more thereof.

In a description of the content of each component in the curable resin composition for a lens according to the aspect of the present invention, in a case where the curable resin composition for a lens includes a solvent, the content of each component is based on the component composition obtained by removing the solvent from the curable resin composition for a lens. For example, in a case where a curable resin composition for a lens is composed of 20 parts by mass of a solvent, 40 parts by mass of a component A, and 40 parts by mass of a component B, for a total of 100 parts by mass, since the content of the component A in the composition is based on 80 parts by mass excluding the solvent, the content thereof is 50% by mass.

In the present invention, "(meth)acrylate" represents either one or both of acrylate and methacrylate, and "(meth) acryloyl" represents either one or both of acryloyl and methacryloyl. The monomer in the present invention is distinguished from an oligomer and a polymer, and refers to a compound having a weight-average molecular weight of 1000 or less.

In the present invention, the term aliphatic hydrocarbon group means a group obtained by removing one optional hydrogen atom from a linear or branched alkane, a linear or branched alkene, or a linear or branched alkyne. In the present invention, the aliphatic hydrocarbon group is preferably an alkyl group obtained by removing one optional hydrogen atom from a linear or branched alkane.

Examples of the alkyl group include a methyl group, an ethyl group, a propyl group, an isopropyl group, a butyl group, an isobutyl group, a sec-butyl group, a tert-butyl group, a pentyl group, an 1-methylbutyl group, a 3-methylbutyl group, a hexyl group, an 1-methylpentyl group, a 4-methylpentyl group, a heptyl group, an 1-methylhexyl group, a 5-methylhexyl group, a 2-ethylhexyl group, an octyl group, an 1-methylheptyl group, a nonyl group, an 1-methyloctyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

In addition, in the present invention, the aliphatic hydrocarbon group (unsubstituted) is preferably an alkyl group having 1 to 20 carbon atoms, and more preferably an alkyl group having 1 to 12 carbon atoms.

In the present invention, the term alkyl group means a linear or branched alkyl group. Examples of the alkyl group include the above-described examples. The same applies to an alkyl group in a group (an alkoxy group, an alkoxycarbonyl group, an acyl group, and the like) including the alkyl group.

In addition, in the present invention, examples of a linear alkylene group include a group obtained by removing one hydrogen atom bonded to a terminal carbon atom from a linear alkyl group among the above-described alkyl groups.

In the present invention, the term alicyclic hydrocarbon ring means a saturated hydrocarbon ring (cycloalkane). Examples of the alicyclic hydrocarbon ring include cyclopropane, cyclobutane, cyclopentane, cyclohexane, cycloheptane, cyclooctane, cyclononane, and cyclodecane.

In the present invention, the term unsaturated hydrocarbon ring means a hydrocarbon ring having a carbon-carbon unsaturated double bond, which is not an aromatic ring. Examples of the unsaturated hydrocarbon ring include indene, indane, and fluorene.

In the present invention, the term alicyclic hydrocarbon group means a cycloalkyl group obtained by removing one optional hydrogen atom from a cycloalkane. Examples of the alicyclic hydrocarbon group include a cyclopropyl group, a cyclobutyl group, a cyclopentyl group, a cyclohexyl group, a cycloheptyl group, a cyclooctyl group, a cyclononyl group, and a cyclodecyl group, and a cycloalkyl group having 3 to 12 carbon atoms is preferable.

In the present invention, a cycloalkylene group refers to a divalent group obtained by removing two optional hydrogen atoms from a cycloalkane. Examples of the cycloalkylene group include a cyclohexylene group.

In the present invention, the term aromatic ring means either one or both of an aromatic hydrocarbon ring and an aromatic heterocyclic ring.

In the present invention, the term aromatic hydrocarbon ring means an aromatic ring in which a ring is formed only by carbon atoms. The aromatic hydrocarbon ring may be a monocyclic ring or a fused ring. Examples of the aromatic hydrocarbon ring include benzene, naphthalene, anthracene, and phenanthrene. In the present invention, in a case where the aromatic hydrocarbon ring is bonded to another ring, it is sufficient that the aromatic hydrocarbon ring may be substituted on another ring as a monovalent or divalent aromatic hydrocarbon group.

In addition, in the present invention, the unsubstituted aromatic hydrocarbon ring is preferably an aromatic hydrocarbon ring having 6 to 14 carbon atoms.

In the present invention, the term monovalent aromatic hydrocarbon group (also referred to as an aryl group) means a monovalent group obtained by removing one optional hydrogen atom from the aromatic hydrocarbon ring. Examples of the monovalent aromatic hydrocarbon group include a phenyl group, an 1-naphthyl groups, a 2-naphthyl groups, an 1-anthracenyl group, a 2-anthracenyl group, a 3-anthracenyl group, a 4-anthracenyl group, a 9-anthracenyl group, an 1-phenanthryl group, a 2-phenanthryl group, a 3-phenanthryl group, a 4-phenanthryl group, and a 9-phenanthryl group. Among these, a phenyl group, an 1-naphthyl group, or a 2-naphthyl group is preferable.

In the present invention, the term divalent aromatic hydrocarbon group means a divalent group obtained by removing two optional hydrogen atoms from the aromatic hydrocarbon ring. Examples of the divalent aromatic hydrocarbon group include a divalent group obtained by removing one optional hydrogen atom from the above-described monovalent aromatic hydrocarbon group. Among these, a phenylene group is preferable, and an 1,4-phenylene group is more preferable.

In the present invention, an aromatic heterocyclic ring means an aromatic ring in which a ring is formed by a carbon atom and a heteroatom. Examples of the heteroatom include an oxygen atom, a nitrogen atom, and a sulfur atom. The aromatic heterocyclic ring may be a monocyclic ring or a fused ring, and the number of atoms constituting the ring is preferably 5 to 20 and more preferably 5 to 14. The number of heteroatoms in the atoms constituting the ring is not particularly limited, but is preferably 1 to 3 and more preferably 1 or 2. Examples of the aromatic heterocyclic ring include furan, thiophene, pyrrole, imidazole, isothiazole, isoxazole, pyridine, pyrazine, quinoline, benzofuran, benzothiazole, and benzoxazole. In the present invention, in a case where the aromatic heterocyclic ring is bonded to another ring, it is sufficient that the aromatic heterocyclic ring may be substituted on another ring as a monovalent or divalent aromatic heterocyclic group.

In the present invention, the term monovalent aromatic heterocyclic group (also referred to as a heteroaryl group) means a monovalent group obtained by removing one optional hydrogen atom from the aromatic heterocyclic ring. Examples of the monovalent aromatic heterocyclic group include a furyl group, a thienyl group (preferably, a 2-thienyl group), a pyrrolyl group, an imidazolyl group, an isothiazolyl group, an isooxazolyl group, a pyridyl group, a pyrazinyl group, a quinolyl group, a benzofuranyl group (preferably, a 2-benzofuranyl group), a benzothiazolyl group (preferably, a 2-benzothiazolyl group), and a benzoxazolyl group (preferably, a 2-benzoxazolyl group). Among these, a furyl group, a thienyl group, a benzofuranyl group, a benzothiazolyl group, or a benzoxazolyl group is preferable, and a 2-furyl group or a 2-thienyl group is more preferable.

In the present invention, the term divalent aromatic heterocyclic group means a divalent group obtained by removing two optional hydrogen atoms from the aromatic heterocyclic ring. Examples of the divalent aromatic heterocyclic group include a divalent group obtained by removing one optional hydrogen atom from the above-described monovalent aromatic heterocyclic group.

In the present invention, examples of the halogen atom include a fluorine atom, a chlorine atom, a bromine atom, and an iodine atom, and a fluorine atom, a chlorine atom, or a bromine atom is preferable.

By subjecting the curable resin composition for a lens according to the aspect of the present invention to a curing reaction, it is possible to obtain a cured product exhibiting a desired wavelength dependence of a refractive index and a high transmittance over a wavelength region from near-infrared to shortwave infrared.

In addition, the cured product according to the aspect the present invention can exhibit the desired wavelength dependence of a refractive index and high transmittance over the wavelength region from near-infrared to shortwave infrared, and can be suitably used for a diffractive optical element and a multilayer diffractive optical element.

DESCRIPTION OF THE PREFERRED EMBODIMENTS

Curable Resin Composition for Lens

A curable resin composition for a lens according to an embodiment of the present invention includes a coloring agent A having a maximal absorption at a wavelength of 520 to 620 nm, in which a wavelength dispersion WD of a cured product of the composition, which is calculated by the following expression (X), is $2.0 \times 10^{-5}$ or more.

$$WD = (nC - n(1129))/(1129 - 656) \quad \text{Expression (X)}$$

In the expression, nC represents a refractive index at a wavelength of 656 nm and n(1129) represents a refractive index at a wavelength of 1129 nm.

The wavelength dispersion WD calculated by the above expression (X) is calculated using a refractive index of the curable resin composition for a lens according to the embodiment of the present invention in a cured state. As long as the curable resin composition for a lens according to the embodiment of the present invention is cured, conditions for producing the cured product are not particularly limited. For example, in a case where the curable resin composition for a lens according to the embodiment of the present invention is photocured, a refractive index of the cured product produced by a method described in Evaluation 1 of Examples described later is measured, and the above-described wavelength WD is calculated.

The wavelength dispersion WD calculated by the above expression (X) is preferably $3.0 \times 10^{-5}$ or more, more preferably $5.0 \times 10^{-5}$ or more, and still more preferably $7.0 \times 10^{-5}$ or more.

In the curable resin composition for a lens according to the embodiment of the present invention, by using the coloring agent A having a maximal absorption at a wavelength of 520 to 620 nm, the wavelength dispersion WD of the cured product of the composition, which is calculated by the above expression (X), can be $2.0 \times 10^{-5}$ or more, and it is possible to exhibit a desired wavelength dependence (high wavelength dispersibility) of a refractive index over the wavelength region from NIR to SWIR. In addition, as disclosed in WO2020/171197A, since the curable resin composition for a lens according to the embodiment of the present invention does not contain ITO particles having absorption at 1750 nm, it is possible to exhibit high transmittance over the wavelength region from NIR to SWIR.

Compared to the near-ultraviolet light-absorbing organic compound disclosed in WO2020/171197A, a compound having absorption in the visible light region has a structure having a high flatness in order to lengthen the absorption and a lengthening of a π-conjugated system. On the other hand, since the compound (solute) having a high flatness and a long π-conjugated system is generally deteriorated in solubility in a resin (solvent), it is not assumed that, in the resin composition disclosed in WO2020/171197A, the compound having absorption in the visible light region is used instead of the near-ultraviolet light-absorbing organic compound.

The curable resin composition for a lens according to the embodiment of the present invention means a composition which has curing properties and with which a cured product (resin) can be obtained by curing, and means a composition used for a lens.

The curable resin composition for a lens according to the embodiment of the present invention may include other components described later, in addition to the above-described components.

Hereinafter, each component will be described.

Coloring Agent A Having Maximal Absorption at Wavelength of 520 to 620 nm

The curable resin composition for a lens according to the embodiment of the present invention includes a coloring agent A having a maximal absorption at a wavelength of 520 to 620 nm (hereinafter, also referred to as a "coloring agent A").

The above-described "having a maximal absorption at a wavelength of 520 to 620 nm" means that an absorption maximal wavelength of the coloring agent A measured in a cured state of the curable resin composition for a lens according to the embodiment of the present invention (that is, a state of a cured product obtained from the curable resin composition for a lens according to the embodiment of the present invention) exists in a wavelength range of 520 to 620 nm. Specifically, it is measured in a state of a cured product under the conditions described in the section of absorbance measurement and light resistance test in Evaluation 2 of Examples described later.

In addition, in a case of a plurality of absorption maximal wavelengths in a wavelength range of 520 to 620 nm, it is sufficient that the absorption maximal wavelength indicating the maximum absorbance exists in the above-described wavelength range. For example, in a case where the coloring agent A is a compound represented by General Formula (a)

and is a mixture of 2 to 4 isomers described later, the above-described maximal absorption of the coloring agent A means the maximal absorption indicating the highest absorbance as a mixture.

The above-described coloring agent A is not particularly limited as long as it has the maximal absorption at a wavelength of 520 to 620 nm, and examples thereof include a tetraazaporphyrin coloring agent and a merocyanine coloring agent.

The merocyanine coloring agent is usually a compound represented by General Formula (β). That is, the merocyanine coloring agent refers to a compound in which one carbon atom constituting a carbon-carbon double bond is substituted with an amino group represented by $-NR^1R^2$ and a heterocyclic ring is bonded to the other carbon atom through a linking group X including a carbon-carbon unsaturated bond.

General Formula (β)

In the formula, $R^1$ to $R^4$ represent a hydrogen atom or a substituent, and $R^1$ and $R^2$, or $R^2$ and $R^3$ may be bonded to each other to form a ring structure.

X represents a linking group including a carbon-carbon unsaturated bond, preferably a linking group including a carbon-carbon double bond and more preferably a linking group formed by alternately linking a carbon-carbon double bond and a carbon-carbon single bond so that a linking portion with Y is a carbon-carbon double bond.

Y represents a heterocyclic ring.

The tetraazaporphyrin coloring agent is a compound having a tetraazaporphyrin skeleton structure.

From the viewpoint of further improving the wavelength dispersion WD calculated by the above expression (X), the above-described coloring agent A is preferably a tetraazaporphyrin coloring agent, more preferably a tetraazaporphyrin metal complex dye in which tetraazaporphyrin is coordinated to a metal atom, and still more preferably a compound represented by General Formula (a).

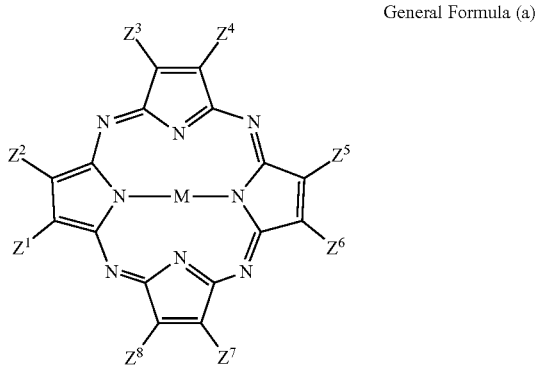

General Formula (a)

In the formula, M represents Pd, Cu, Ni, Co, or V(=O).
In each combination of two groups, $Z^1$ and $Z^2$, $Z^3$ and $Z^4$, $Z^5$ and $Z^6$, and $Z^7$ and $Z^8$ of $Z^1$ to $Z^8$, one group α constituting the combination is a phenyl group having a substituent (substituted phenyl group) and the other group 13 is a hydrocarbon group having 1 to 6 carbon atoms.

In the formula, on a plane of paper, nitrogen atoms located above and below M are coordinated to M by unshared electron pairs. The same applies to Exemplary Compounds described later and compounds used in Examples.

In the M, Pd, Cu, Ni, and Co are divalent metals and V(=O) is a metal having an oxy group, and in a case where M is V(=O), the M is bonded as represented by a compound (TAP-5) described later.

The M is preferably Pd, Cu, Ni, Co, or V(=O), and more preferably Pd or Cu.

In the above-described compound represented by General Formula (a), in each combination of two groups, $Z^1$ and $Z^2$, $Z^3$ and $Z^4$, $Z^5$ and $Z^6$, and $Z^7$ and $Z^8$, four types of isomers are included depending on which of the two groups constituting the combination is the group α. As described in paragraph [0045] of JP2012-121821A, for the convenience of synthesizing the above-described compound represented by General Formula (a), it is usually obtained as a mixture of four isomers.

In the present invention, the above-described compound represented by General Formula (a) may include at least one of the four isomers, or may be a mixture of two to four isomers.

Group α

In the above-described group α, examples of the substituent in the substituted phenyl group include a halogen atom, a nitro group, a cyano group, a hydroxy group, an alkyl group, and an alkoxy group, and a halogen atom or an alkyl group is preferable.

As the above-described halogen atom, a fluorine atom, a chlorine atom, or a bromine atom is preferable, and a fluorine atom or a chlorine atom is more preferable. As the above-described alkyl group, an alkyl group having 1 to 3 carbon atoms is preferable, and as the above-described alkoxy group, an alkoxy group having 1 to 3 carbon atoms is preferable. The above-described alkyl group may be substituted with a substituent, examples thereof include a substituent substituted with a halogen atom or a dialkylaminoalkyl group, and a fluorinated alkyl group or a dialkylaminoalkyl group is preferable.

A substitution position of the substituent included in the phenyl group is not particularly limited, but it is preferable that at least one of ortho positions or para positions of the phenyl group is substituted, it is more preferable that at least one of ortho positions of the phenyl group is substituted, and it is still more preferable to have the substituent on only one of ortho positions of the phenyl group.

In addition, in a case where the phenyl group of the above-described group α has two adjacent substituents, these substituents may be bonded to each other to form a ring. The formed ring is preferably a 5-membered ring or a 6-membered ring, and may be an aliphatic ring or an aromatic ring, but an aromatic ring is preferable, and examples thereof include a benzene ring. As the substituent in which the phenyl group has two adjacent substituents and these substituents are bonded to each other to form a ring, a naphthyl group is preferable, and a 1-naphthyl group is more preferable.

As the above-described group α, a halogen atom, a phenyl group having, as a substituent, an unsubstituted alkyl group or a fluorinated alkyl group, or a naphthyl group is preferable, and a 2-fluorophenyl group, a 4-fluorophenyl group, a 2,4-difluorophenyl group, a 2,6-difluorophenyl group, a 2-chlorophenyl group, a 4-chlorophenyl group, a 2,4-dichlorophenyl group, a 2,6-dichlorophenyl group, a 2-bromophenyl group, a 4-bromophenyl group, a 2,4-dibromophenyl group, a 2,6-dibromophenyl group, a 2-methylphenyl group, a 4-methylphenyl group, a 2,4-dimethylphenyl group, a 2,6-dimethylphenyl group, a 2-trifluoromethylphenyl group, a 4-trifluoromethylphenyl group, a 2,4-bis(trifluoromethyl) phenyl group, a 2,6-bis(trifluoromethyl)phenyl group, or a 1-naphthyl group is more preferable.

Group β

In the above-described group β, as the hydrocarbon group having 1 to 6 carbon atoms, an alkyl group having 1 to 6 carbon atoms or a cycloalkyl group having 3 to 6 carbon atoms is preferable.

As the above-described group β, linear, branched, or cyclic alkyl groups such as a methyl group, an ethyl group, an n-propyl group, an iso-propyl group, an n-butyl group, an iso-butyl group, a sec-butyl group, a tert-butyl group, an n-pentyl group, a 2-methylbutyl group, a 1-methylbutyl group, a neo-pentyl group, a 1,2-dimethylpropyl group, a 1,1-dimethylpropyl group, a cyclopentyl group, an n-hexyl group, a 4-methylpentyl group, a 3-methylpentyl group, a 2-methylpentyl group, a 1-methylpentyl group, a 3,3-dimethylbutyl group, a 2,3-dimethylbutyl group, a 1,3-dimethylbutyl group, a 2,2-dimethylbutyl group, a 1,2-dimethylbutyl group, a 1,1-dimethylbutyl group, a 3-ethylbutyl group, a 2-ethylbutyl group, a 1-ethylbutyl group, a 1,1,2-trimethylpropyl group, a 1-ethyl-2-methylpropyl group, and a cyclohexyl group are preferable.

Among these, a tert-butyl group or a cyclohexyl group is more preferable.

Examples of the merocyanine coloring agent include the compound represented by Formula (MC1) described in JP2017-68221A and the compound represented by General Formula (II) described in JP2006-188582A.

In addition, examples of the tetraazaporphyrin coloring agent include the following compounds (TAP-1) to (TAP-8). Wavelengths described in the following compounds mean the maximal absorption wavelength.

The maximal absorption wavelength described in this paragraph and the next paragraph means the maximal absorption wavelength measured for a solution in which the compound is dissolved in a solvent. By using these compounds, the cured product obtained from the curable resin composition for a lens according to the embodiment of the present invention can exhibit the maximal absorption wavelength in a wavelength of 520 to 620 nm.

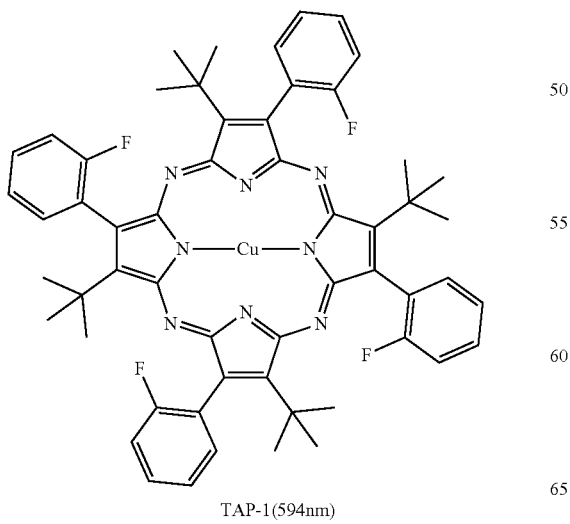

TAP-1(594nm)

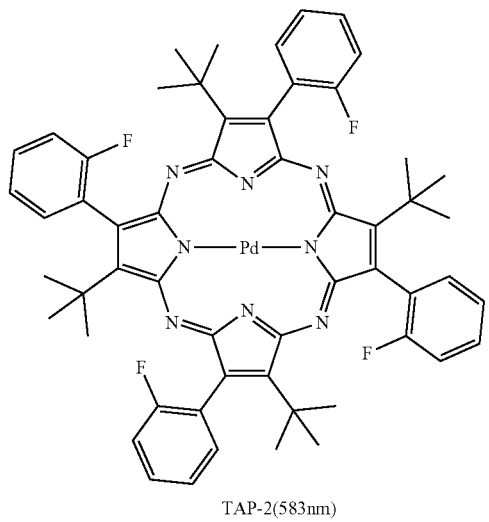

TAP-2(583nm)

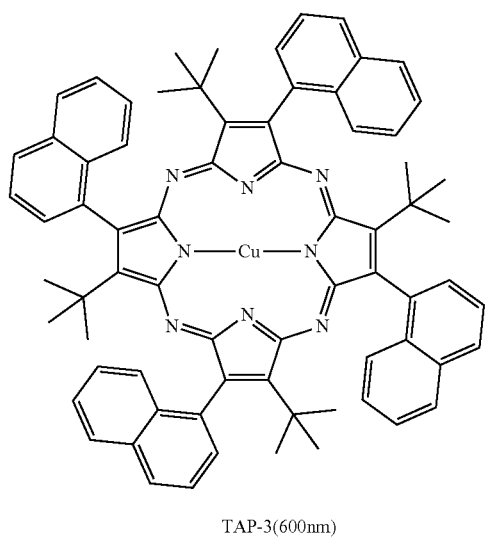

TAP-3(600nm)

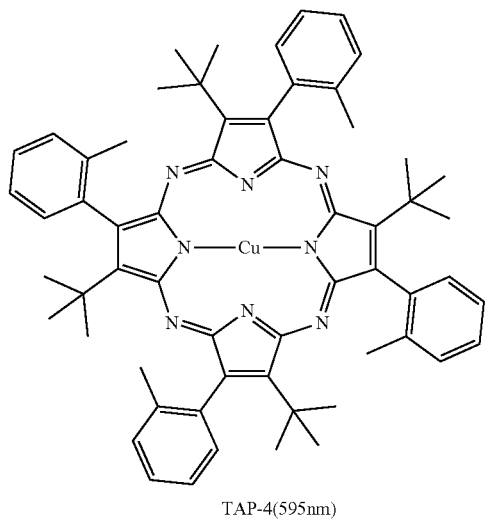

TAP-4(595nm)

-continued

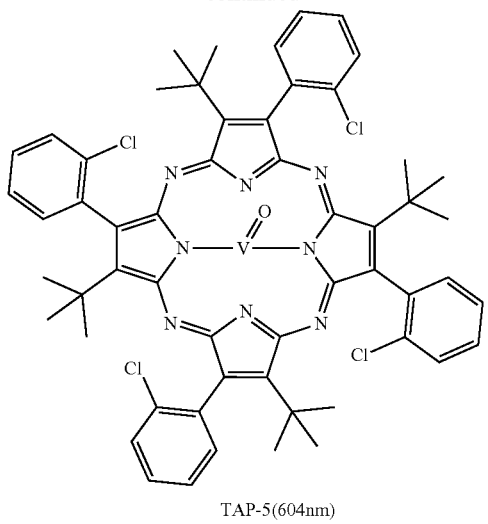

TAP-5(604nm)

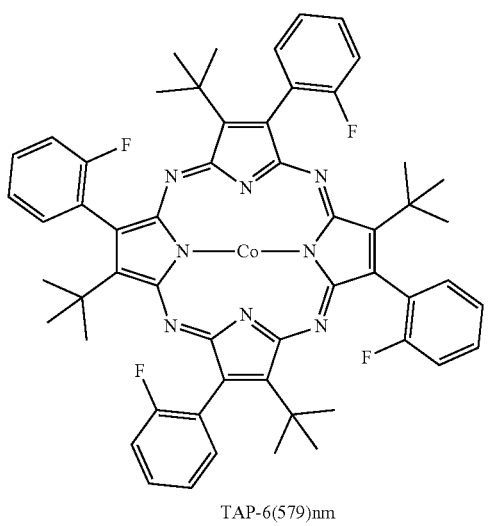

TAP-6(579)nm

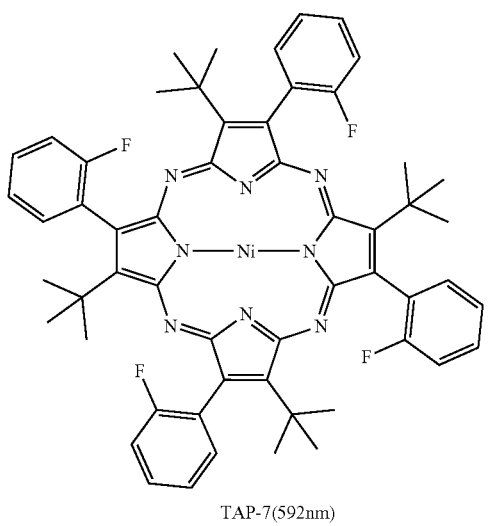

TAP-7(592nm)

-continued

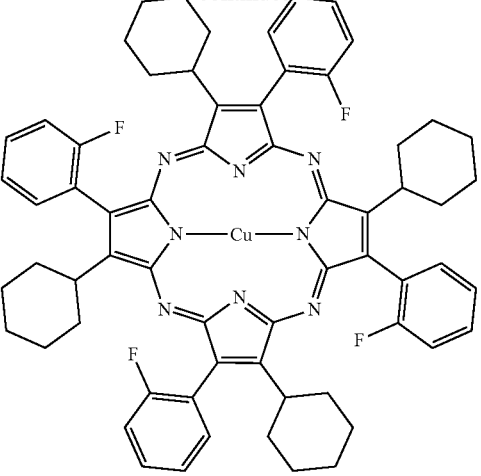

TAP-8(597nm)

Examples of a commercially available product of the above-described coloring agent A include FDG-002 (maximal absorption wavelength: 525 nm, merocyanine coloring agent), FDG-003 (maximal absorption wavelength: 547 nm, merocyanine coloring agent), FDG-004 (maximal absorption wavelength: 578 nm), FDG-005 (maximal absorption wavelength: 583 nm, tetraazaporphyrin coloring agent), and FDG-007 (maximal absorption wavelength: 594 nm, tetraazaporphyrin coloring agent), all manufactured by YAMADA CHEMICAL CO., LTD.

A method for obtaining the above-described coloring agent A is not particularly limited, and the above-described commercially available product may be used or a compound obtained by synthesis may be used. In a case of being obtained by synthesis, a method for producing the coloring agent A is not particularly limited, and the coloring agent A can be produced according to a conventional method with reference to the method described in JP2012-121821A and Examples described later.

A content of the above-described coloring agent A in the curable resin composition for a lens according to the embodiment of the present invention may be adjusted according to the maximal absorption wavelength of the coloring agent A and according to components other than the coloring agent A, which may be contained, such as a metal oxide T described later.

Typically, the content of the above-described coloring agent A in the curable resin composition for a lens according to the embodiment of the present invention is preferably 1% to 30% by mass, more preferably 2% to 25% by mass, still more preferably 5% to 20% by mass, and particularly preferably 7% to 20% by mass. In addition, in a case of containing the metal oxide T described later, the content of the coloring agent A can be reduced, for example, the content may be 1% to 25% by mass, preferably 1% to 20% by mass and more preferably 1% to 15% by mass.

By setting the content of the above-described coloring agent A within the above-described preferred range, the effect of improving the wavelength dispersion characteristics in the wavelength region from NIR to SWIR can be sufficiently obtained.

Two or more kinds of the above-described coloring agents A may be contained in the curable resin composition for a lens according to the embodiment of the present invention. In a case of containing two or more kinds of the above-described coloring agents A, the total content is preferably within the above-described range.

Other Components

The curable resin composition for a lens according to the embodiment of the present invention may further include other components in addition to the above-described coloring agent A. Specific examples of the other components include a (meth)acrylate monomer compound, a metal oxide, a polymer dispersant, a polymerization initiator, and a polymer.

(Meth)Acrylate Monomer

The curable resin composition for a lens according to the embodiment of the present invention may include a (meth) acrylate monomer.

The (meth)acrylate monomer may be a polyfunctional (bifunctional or higher) (meth)acrylate monomer compound having two or more (meth)acryloyl groups in the molecule, or may be a monofunctional (meth)acrylate monomer having one (meth)acryloyl group in the molecule.

The upper limit of the number of (meth)acryloyl groups included in the (meth)acrylate monomer is not particularly limited, and may be, for example, 8 functional or less.

Specific examples of the (meth)acrylate monomer include the following monomer 1 (phenoxyethyl acrylate), monomer 2 (benzyl acrylate), monomer 3 (tricyclodecanedimethanol diacrylate), and monomer 4 (dicyclopentanyl acrylate). In addition, specific examples thereof include M-1 (1,6-hexanediol diacrylate), M-2 (1,6-hexanediol dimethacrylate), M-3 (benzyl acrylate), M-4 (isobornyl methacrylate), M-5 (dicyclopentanyl methacrylate), M-6 (dodecyl methacrylate), M-7 (2-ethylhexyl acrylate), M-8 (2-hydroxyethyl acrylate), M-9 (hydroxypropyl acrylate), M-10 (4-hydroxybutyl acrylate), M-11 (2-ethylhexyl methacrylate), and M-12 (decyl methacrylate). In addition to the above, examples thereof include (meth)acrylate monomers described in paragraphs 0037 to 0046 of JP2012-107191A.

Among the above, as the (meth)acrylate monomer, 2-ethylhexyl methacrylate, decyl methacrylate, or dodecyl methacrylate is preferable, and from the viewpoint of more excellent light resistance and transmittance, decyl methacrylate or dodecyl methacrylate is more preferable.

A molecular weight of the (meth)acrylate monomer is preferably 100 to 500.

Monomer 1

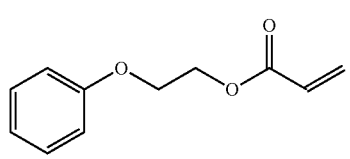

Monomer 2

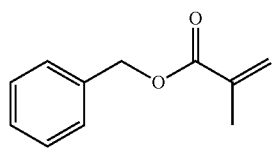

Monomer 3

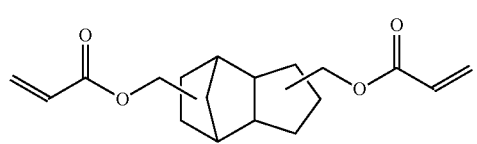

Monomer 4

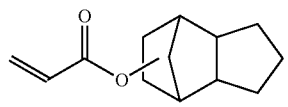

(M-1)

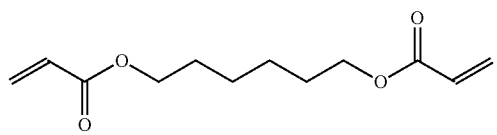

(M-2)

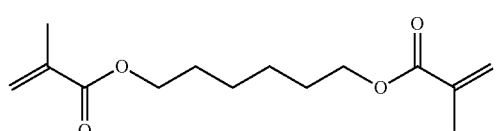

(M-3)

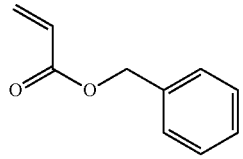

(M-4)

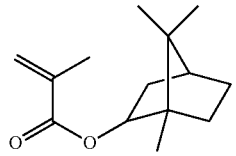

(M-5)

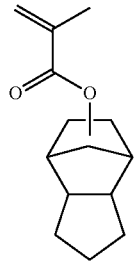

(M-6)

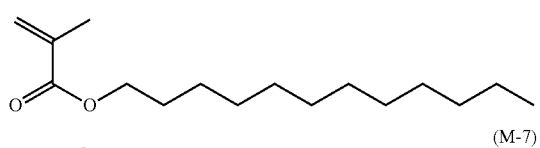

(M-7)

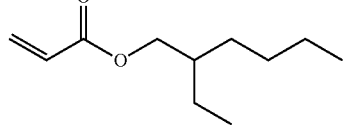

(M-8)

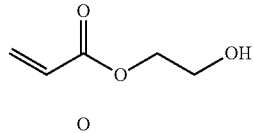

(M-9)

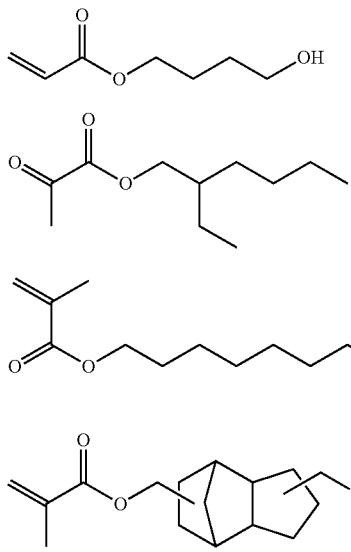

(M-10)
(M-11)
(M-12)
(M-13)

A method for obtaining the (meth)acrylate monomer is not particularly limited, and the (meth)acrylate compound may be obtained commercially or may be synthesized by a conventional method.

In a case of being obtained commercially, for example, Viscoat #192 PEA (monomer 1 described above) (manufactured by OSAKA ORGANIC CHEMICAL INDUSTRY LTD.), Viscoat #160 BZA (monomer 2 described above) (manufactured by OSAKA ORGANIC CHEMICAL INDUSTRY LTD.), Lightester Bz (monomer 2 described above) (manufactured by KYOEISHA CHEMICAL Co., LTD.), A-DCP (monomer 3 described above) (manufactured by Shin-Nakamura Chemical Co., Ltd.), FA-513AS (monomer 4 described above) (manufactured by Hitachi Chemical Co., Ltd.), A-HD-N (M-1 described above) (manufactured by Shin-Nakamura Chemical Co., Ltd.), HD-N (M-2 described above) (manufactured by Shin-Nakamura Chemical Co., Ltd.), FA-BZA (M-3 described above) (manufactured by Hitachi Chemical Co., Ltd.), Lightester IB-X (M-4 described above) (manufactured by KYOEISHA CHEMICAL Co., LTD.), FA-513M (M-5 described above) (manufactured by Hitachi Chemical Co., Ltd.), Lightester L (M-6 described above) (manufactured by KYOEISHA CHEMICAL Co., LTD.), 2EHA (M-7 described above) (manufactured by TOAGOSEI CO., LTD.), HEA (M-8 described above) (manufactured by OSAKA ORGANIC CHEMICAL INDUSTRY LTD.), Lightester HOP-A(N) (M-9 described above) (manufactured by KYOEISHA CHEMICAL Co., LTD.), 4-HBA (M-10 described above) (manufactured by OSAKA ORGANIC CHEMICAL INDUSTRY LTD.), or DCP (M-13 described above) (manufactured by Shin-Nakamura Chemical Co., Ltd.) can be preferably used.

In addition, in a case where it is necessary to increase the hardness and rub resistance of the surface of the cured product, the curable resin composition for a lens preferably includes a polyfunctional (meth)acrylate monomer having three or more (meth)acryloyl groups in the molecule. By including a polyfunctional (meth)acrylate monomer having three or more (meth)acryloyl groups in the molecule, the crosslink density of the cured product can be effectively improved, so that the surface hardness and rub resistance can be increased while maintaining a high partial dispersion ratio. The upper limit of the number of (meth)acryloyl groups in the polyfunctional (meth)acrylate monomer having three or more (meth)acryloyl groups in the molecule is not particularly limited, but is preferably 8 and more preferably 6. In a case of being obtained commercially, for example, A-TMPT (monomer 5), A-TMMT (monomer 6), AD-TMP (monomer 7), and A-DPH (monomer 8) (all manufactured by Shin-Nakamura Chemical Co., Ltd.) can be preferably used.

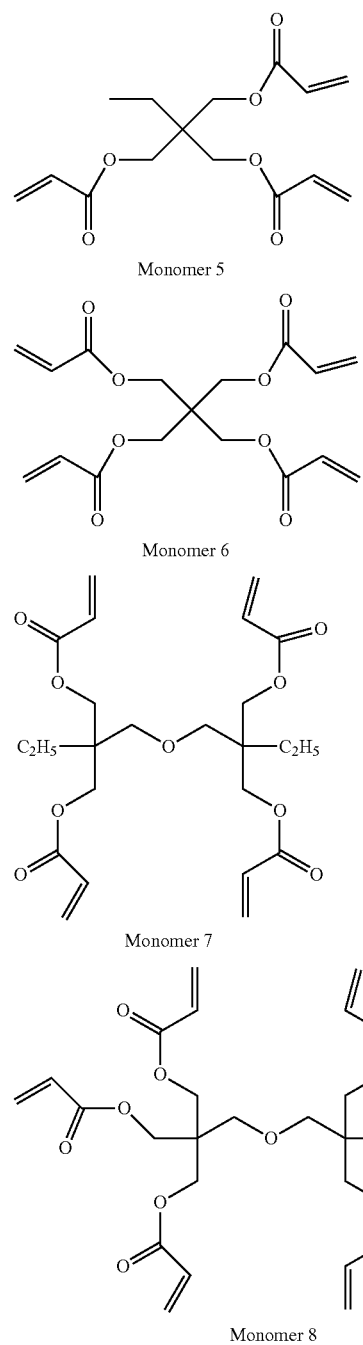

Monomer 5

Monomer 6

Monomer 7

Monomer 8

It is preferable that the curable resin composition for a lens according to the embodiment of the present invention includes at least one of a polyfunctional (meth)acrylate monomer or a monofunctional (meth)acrylate monomer, in which, in a case where the monofunctional (meth)acrylate monomer is a homopolymer, a glass transition temperature (Tg) is 100° C. or higher.

In particular, in the curable resin composition for a lens according to the embodiment of the present invention, by containing, as the coloring agent A having a maximal absorption at a wavelength of 520 to 620 nm, the tetraazaporphyrin coloring agent, and containing, as a component constituting the resin in the cured product, at least one of a bifunctional or higher (meth)acrylate monomer or a monofunctional (meth)acrylate monomer in which Tg of a homopolymer is 100° C., it is possible to suppress the decrease in absorbance due to light irradiation and further improve the light resistance. Although presumption, the reason is considered as follows.

In the curable resin composition for a lens according to the embodiment of the present invention, which includes at least one of a bifunctional or higher (meth)acrylate monomer or a monofunctional (meth)acrylate monomer in which a glass transition temperature (Tg) of a homopolymer is 100° C., a hardness of a cured product to be obtained can be effectively increased. Coloring agent molecules in the cured product excited by light irradiation are usually deactivated by a pathway in which decomposition occurs by a reaction with other molecules and a pathway in which deactivation to a ground state occurs by heat deactivation. However, since the tetraazaporphyrin coloring agent does not go through the above-described heat deactivation pathway and goes through the above-described decomposition pathway, it is considered that, by preparing the curable resin composition for a lens according to the embodiment of the present invention as a composition including at least one of a bifunctional or higher (meth)acrylate monomer or a monofunctional (meth)acrylate monomer in which a glass transition temperature (Tg) of a homopolymer is 100° C., the decomposition of the coloring agent due to the above-described reaction with other molecules is suppressed, and excellent light resistance can be exhibited.

The Tg of the homopolymer obtained from the above-described monofunctional (meth)acrylate monomer means Tg obtained by, for example, a dynamic viscoelastic measurement (for example, a measurement using Rheogel-E4000 (product name) manufactured by UBM in a measurement temperature range of −50° C. to 250° C.) for a homopolymer obtained by curing the monofunctional (meth)acrylate monomer.

Preferred examples of the monofunctional (meth)acrylate monomer in which the above-described Tg of the homopolymer is 100° C. include the above-described monomer 4 (Tg: 120° C.), M-4 (Tg: 180° C.), and M-5 (Tg: 175° C.). For the above-described Tg of the homopolymer, for example, values described in Polymer Handbook (4th Edition, published by Wiley-Interscience) can be referred to.

The Tg of the homopolymer of the above-described monofunctional (meth)acrylate monomer is preferably 105° C. or higher, more preferably 110° C. or higher, and still more preferably 115° C. or higher. The upper limit value thereof is not particularly limited, but is practically 250° C. or lower.

In a case where the curable resin composition for a lens contains a (meth)acrylate monomer, a content of the (meth)acrylate monomer in the curable resin composition for a lens is preferably 20% to 99% by mass, more preferably 30% to 97% by mass, and still more preferably 40% to 95% by mass. By adjusting the amount of the (meth)acrylate monomer in the curable resin composition for a lens, it is possible to adjust a function of relieving a stress in a case where the cured product undergoes a thermal change.

Metal Oxide

The curable resin composition for a lens according to the embodiment of the present invention preferably includes a metal oxide having a maximal absorption at a wavelength of 1900 to 4000 nm (hereinafter, also referred to as a "metal oxide T"). By including the above-described coloring agent A having a maximal absorption at a wavelength of 520 to 620 nm and the metal oxide having a maximal absorption at a wavelength of 1900 to 4000 nm in combination, the wavelength dispersion WD calculated by the above expression (X) can be improved while reducing the content of the coloring agent.

The metal oxide T is not particularly limited as long as it has a maximal absorption at a wavelength of 1900 to 4000 nm, but examples thereof include antimony-doped tin oxide and tin-doped indium oxide (in the present invention, also referred to as "indium tin oxide"), and indium tin oxide (in the present invention, also abbreviated as "ITO) is preferable.

From the viewpoint of suppressing polarization in XY, the metal oxide T is preferably metal oxide particles and more preferably ITO particles. As for a particle size, the following description relating to the particle size of ITO particles can be adopted.

The maximal absorption wavelength of the metal oxide T is preferably in a wavelength range of 1950 to 3800 nm, and more preferably in a wavelength range of 2000 to 3600 nm.

Hereinafter, the ITO particles will be described in detail. As for the metal oxide or the metal oxide particles, the ITO particles in the following description of the ITO particles can be replaced with the metal oxide or the metal oxide particles and adopted.

Indium Tin Oxide Particles (ITO Particles)

A particle size of the ITO particles is preferably 5 to 50 nm. By setting the particle size to 50 nm or less, it is possible to prevent a decrease in transmittance due to Rayleigh scattering. In addition, by setting the particle size to 5 nm or more, it is possible to perform a production of the ITO particles without technical difficulty. The particle size of the ITO particles can be obtained by averaging particle sizes which are measured by a transmission electron microscope (TEM). That is, a minor axis and a major axis of one particle in an electron micrograph imaged by TEM are measured, and the average value thereof is determined as a particle size of one particle. In the present invention, particle sizes of 500 particles are randomly obtained, and the average value (arithmetic mean) of these 500 particle sizes is calculated and used as an average primary particle diameter (particle size of the ITO particles).

In a case where the curable resin composition for a lens according to the embodiment of the present invention contains ITO particles, the curable resin composition for a lens according to the embodiment of the present invention is preferably prepared by mixing the ITO particles dispersed in a solvent with the above-described coloring agent A and a polymer (dispersant) described later. After mixing, the solvent used for dispersing the ITO particles may or may not be removed from the curable resin composition for a lens by distillation or the like, but it is preferable to be removed.

The dispersibility of the ITO particles in a solvent can be improved by using surface-modified ITO particles. The surface modification of the ITO particles is preferably performed using, for example, a monocarboxylic acid having 6 to 20 carbon atoms as a surface-modified compound. As the surface modification of the ITO particles with a monocarboxylic acid, it is preferable that a carboxy group derived from the monocarboxylic acid forms an ester bond with an oxygen atom on the surface of the ITO particles, or the carboxy group is coordinated with In or Ti atom.

Examples of the monocarboxylic acid having 6 to 20 carbon atoms include oleic acid (having 18 carbon atoms), stearic acid (having 18 carbon atoms), palmitic acid (having 16 carbon atoms), myristic acid (having 14 carbon atoms), and decanoic acid (having 10 carbon atoms), and oleic acid (having 18 carbon atoms) is preferable.

In the curable resin composition for a lens, a moiety derived from the surface-modified compound in the ITO particles (for example, a group derived from a monocarboxylic acid having 6 to 20 carbon atoms) bonded to the ITO particles by the above-described surface modification may be bonded to the ITO particles as it is, a part thereof may be replaced with a group derived from a polymer described later, or all may be replaced with groups derived from a polymer described later. In the curable resin composition for a lens according to the embodiment of the present invention, it is preferable that both the moiety derived from the surface-modified compound (for example, a group derived from a monocarboxylic acid having 6 to 20 carbon atoms) and the group derived from the polymer described later are bonded to the surface of the ITO particles.

As the solvent, a solvent, in which a constituent ($\delta p$) of a polarity element in a solubility parameter (SP value) is 0 to 6 $MPa^{(1/2)}$, is preferable.

The constituent ($\delta p$) of the polarity element in the SP value is a value calculated by the Hansen solubility parameter. The Hansen solubility parameter is constituted of intermolecular dispersive force energy ($\delta d$), intermolecular polar energy ($\delta p$), and intermolecular hydrogen bonding energy ($\delta h$). In the present invention, the Hansen solubility parameter is a value calculated using HSPiP (version 4.1.07) software.

Specifically, the solvent is preferably toluene (1.4), xylene (1.0), or hexane (0), and more preferably toluene. The value in the parentheses is a value of $\delta p$, and the unit is $MPa^{(1/2)}$.

A method for producing the ITO particles is not particularly limited, and for example, the ITO particles can be produced according to the procedure described in ACS Nano 2016, 10, pp. 6942 to 6951. According to the procedure of the reference, a dispersion liquid of surface-modified ITO particles is obtained.

Specifically, a solution obtained by mixing a monocarboxylic acid having 6 to 20 carbon atoms, an indium salt (for example, indium acetate), and a tin salt (for example, tin acetate) is added dropwise to an alcohol (long-chain alcohol such as oleyl alcohol) heated to high temperature, and the mixture is retained at high temperature, thereby capable of forming particles.

Thereafter, a poor solvent (lower alcohol such as ethanol) having low polymer solubility is added thereto to precipitate the particles, the supernatant is removed, and the particles are redispersed in the above-described solvent such as toluene, thereby capable of forming a dispersion liquid of surface-modified ITO particles.

In a case where the curable resin composition for a lens according to the embodiment of the present invention contains the metal oxide T (more preferably, the ITO particles), a content proportion of the metal oxide T (more preferably, the ITO particles) in the curable resin composition for a lens according to the embodiment of the present invention is preferably 10% to 65% by mass, more preferably 15% to 60% by mass, and still more preferably 20% to 55% by mass.

In the curable resin composition for a lens according to the embodiment of the present invention, from the viewpoint of further improving the wavelength dispersion WD of the cured product of the composition, which is calculated by the above expression (X), it is preferable that the content of the above-described coloring agent A in the composition is 15% by mass or more, or the metal oxide having a maximal absorption at a wavelength of 1900 to 4000 nm is included.

Polymer (Dispersant)

The curable resin composition for a lens according to the embodiment of the present invention preferably includes a polymer which functions as a dispersant of the above-described metal oxide in the curable resin composition for a lens (hereinafter, this polymer is also referred to as a "polymer dispersant"). The polymer dispersant is not particularly limited as long as it has a function of dispersing the above-described metal oxide (preferably, the metal oxide particles) in the curable resin composition for a lens according to the embodiment of the present invention, but the polymer dispersant is preferably a polymer having a constitutional unit represented by General Formula (P) and having an acidic group at one terminal of a polymer chain (hereinafter, referred to as a "polymer dispersant P").

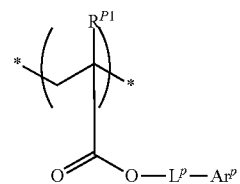

General Formula (P)

In the formula, $L^P$ represents a single bond or a divalent linking group, $Ar^P$ represents an aryl group, and $R^{P1}$ represents a hydrogen atom or a methyl group. However, $Ar^P$ does not include the acidic group. * represents a bonding portion for incorporation into a polymer main chain.

As the aryl group of $Ar^P$, a phenyl group, a 1-naphthyl group, or a 2-naphthyl group is preferable. Preferred examples of the substituent which may be included in the aryl group include an alkyl group, an alkoxy group, and an aryl group.

It is preferable that the methyl group which can be adopted as $R^{P1}$ does not include the above-described acidic group as a substituent.

The above-described polymer dispersant P is a polymer which has an acidic group exhibiting an adsorbing group for the metal oxide T such as ITO particles at one terminal of the polymer chain and also has the constitutional unit represented General Formula (P) including $Ar^P$ (aryl group). Since the curable resin composition for a lens according to the embodiment of the present invention contains the above-described polymer dispersant P together with the above-described metal oxide T such as ITO particles and the above-described coloring agent A, a compatibility of components increases due to a π-π interaction between $Ar^P$ included in the side chain of the polymer dispersant P and the aromatic ring included in the above-described coloring agent A, an interaction between the acidic group of the polymer dispersant and the above-described metal oxide T such as ITO particles, and the like, and dispersion stability can be effectively enhanced during preparation of the composition and in medium to long term.

As the acidic group included in the polymer dispersant P at one terminal of the polymer chain, it is preferable to select from a carboxy group (—COOH), a phosphono group (—P(═O)(OH)$_2$), a phosphonooxy group (—OP(═O)(OH)$_2$), a hydrohydroxyphosphoryl group (—PH(═O)(OH)), a sulfino group (—S(═O)(OH)), a sulfo group (—S(═O)$_2$(OH)), or a sulfanyl group (—SH).

The other terminal of the polymer chain in the above-described polymer dispersant P is not particularly limited as long as the desired dispersibility can be obtained, but it is preferable that the other terminal thereof does not have an acidic group, and the other terminal thereof can be, for example, a hydrogen atom, an alkyl group, or the like.

For convenience of synthesis, the above-described polymer dispersant P may include a small amount of a polymer having acidic groups at both terminals of the polymer chain, in addition to the polymer having an acidic group at one terminal of the polymer chain. However, as long as the above-described polymer dispersant P is substantially composed of the polymer having an acidic group at one terminal of the polymer chain, even in a case where the above-described polymer having acidic groups at both terminals is included, the dispersion stability of the composition can be enhanced.

In addition, the above-described polymer dispersant P may include an acidic group in the side chain of the polymer chain as long as the desired dispersibility is obtained. However, in a case where the side chain includes an acidic group, it is preferable not to include the acidic group because the ITO particles tend to aggregate.

The above-described acidic group exhibits an adsorption action on a surface of the indium tin oxide particles by at least one of an ionic bond, a covalent bond, a hydrogen bond, or a coordinate bond.

From the viewpoint of further improving the medium- to long-term dispersion stability, the above-described acidic group is more preferably a carboxy group, a phosphono group, or a phosphonooxy group, and still more preferably a carboxy group.

In General Formula (P), examples of the divalent linking group which can be adopted as L$^P$ include an alkylene group, *-(alkylene-O)$_n$—, and ester (—O—(C═O)—). The number of carbon atoms in the alkylene moiety is preferably 1 to 4 and more preferably 1 or 2. n is preferably 1 to 10, more preferably 1 to 6, still more preferably 1 or 2, and particularly preferably 1.

L$^P$ is preferably an alkylene group or *-(alkylene-O)$_n$—, and more preferably a single bond, —CH$_2$—, *—CH$_2$O—, or *—CH$_2$CH$_2$O—.

* in the above description of L$^P$ represents a bonding site on a side which does not bond with Ar$^P$.

A main chain skeleton portion of the above-described polymer dispersant P may be linear or branched. Among these, it is preferable to be linear.

As long as the desired dispersibility is obtained, the above-described polymer dispersant P may have a constitutional unit represented by General Formula (P2) in addition to the constitutional unit represented by General Formula (P).

General Formula (P2)

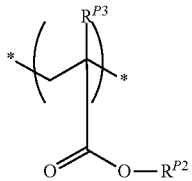

In the formula, R$^{P3}$ represents a hydrogen atom or a methyl group, and R$^{P2}$ represents a monovalent substituent. However, R$^{P2}$ is not -L$^P$-Ar$^P$ in General Formula (P) described above. * represents a bonding portion for incorporation into a polymer main chain.

R$^{P2}$ is preferably an alkyl group or an alicyclic hydrocarbon group, and more preferably an alkyl group. From the viewpoint of suppressing aggregation of the ITO particles, the monovalent substituent which can be adopted as R$^{P2}$ preferably does not include the above-described acidic group. The number of carbon atoms in this alkyl group is preferably 1 to 20, more preferably 1 to 12, and still more preferably 1 to 8.

It is preferable that the methyl group which can be adopted as R$^{P3}$ does not include the above-described acidic group as a substituent.

In the above-described polymer dispersant P, it is preferable that the main chain structure and the side chain structure are composed of the constitutional unit represented by General Formula (P), and it is also preferable to be composed of the constitutional unit represented by General Formula (P) and the constitutional unit represented by General Formula (P2). In addition, as long as the desired dispersibility is obtained, the above-described polymer dispersant may have a constitutional unit different from the constitutional units represented by General Formula (P) and General Formula (P2) (constitutional unit derived from a monomer having an ethylenically unsaturated bond, which is not the constitutional unit represented by each of General Formulae (P) and (P2)). In a case where the above-described polymer dispersant P is a copolymer, it may be either random or block.

A proportion of General Formula (P) to all constitutional units constituting the above-described polymer dispersant P is not particularly limited, but is preferably 5 mol % or more, for example. From the viewpoint of further improving the medium- to long-term dispersion stability, the above-described proportion is more preferably 10 mol % or more and still more preferably 15 mol % or more. The upper limit value of this proportion is not particularly limited, and it is also preferable that all constitutional units in the above-described polymer dispersant P are the constitutional unit represented by General Formula (P).

In a case where the above-described polymer dispersant P contains the constitutional unit represented by General Formula (P2), a proportion of General Formula (P2) to all constitutional units constituting the polymer dispersant P is, for example, preferably 95 mol % or less, more preferably 90 mol % or less, and still more preferably 85 mol % or less. The lower limit value of the above-described proportion in a case of containing the constitutional unit represented by General Formula (P2) is not particularly limited, and may be more than 0 mol %.

The constitutional unit constituting the above-described polymer dispersant P means a constitutional unit derived from a monomer component, and can be calculated from a content ratio of the monomer component.

The content of the constitutional unit represented by General Formula (P) in the above-described polymer dispersant P is not particularly limited, but is preferably, for example, 20% by mass or more. From the viewpoint of further improving the medium- to long-term dispersion stability, the above-described content is more preferably 30% by mass or more and still more preferably 50% by mass or more. The upper limit value of this content is not particularly limited, and it is also preferable that all constitutional units in the above-described polymer dispersant P are the constitutional unit represented by General Formula (P).

The above-described polymer dispersant P preferably has, at one terminal of the polymer chain, a structural portion represented by General Formula (PA) as a structural portion including the above-described acidic group.

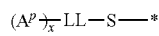

General Formula (PA)

In the formula, $A^P$ represents an acidic group, LL represents a single bond or an (x+1)-valent linking group, and x represents an integer of 1 to 8. * represents a bonding position with the rest of the polymer dispersant P.

The acidic group which can be adopted as $A^P$ has the same meaning as the acidic group described above, and the preferred aspect thereof is also the same.

Examples of the (x+1)-valent linking group which can be adopted as LL include an (x+1)-valent saturated fatty acid hydrocarbon group (group obtained by removing x+1 hydrogen atoms from alkane) and an (x+1)-valent alicyclic hydrocarbon group (group obtained by removing x+1 hydrogen atoms from alicyclic hydrocarbon). In addition, examples thereof include an (x+1)-valent group consisting of a combination of these groups and a bond selected from —O—, —(C=O)—O—, or —(C=O)—NH—. LL is preferably an (x+1)-valent alkane or a group consisting of a combination of an (x+1)-valent alkane and —O—.

x is preferably an integer of 1 to 6, more preferably an integer of 2 to 4, and still more preferably an integer of 2.

The structure represented by General Formula (PA) is preferably a structure represented by General Formula (PA1), and from the viewpoint of improving the adsorptivity to the metal oxide T such as ITO particles by having a carboxy group in the adjacent site, more preferably a structure represented by Formula (PA2).

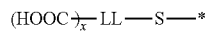

General Formula (PA1)

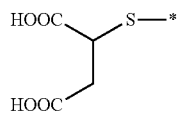

general Formula (PA2)

LL and x in the formulae have the same meaning as LL and x in General Formula (PA) described above. * represents a bonding position with the rest of the polymer dispersant.

An acid value of the above-described polymer dispersant P is preferably 2.0 mgKOH/g or more and less than 100 mgKOH/g, more preferably 2.0 mgKOH/g or more and less than 70 mgKOH/g, and still more preferably 10 mgKOH/g or more and less than 50 mgKOH/g. The acid value means the number in mg of potassium hydroxide required to neutralize acid components present in 1 g of the polymer.

By adjusting the molecular weight of the polymer dispersant and the number of acidic groups such as a carboxy group so that the acid value of the polymer dispersant is within the above-described preferred range, it is possible to achieve both appropriate viscosity and particle dispersion performance as the curable resin composition for a lens. In a case where the acid value of the polymer dispersant is 2.0 mgKOH/g or more, the polymer dispersant P can be sufficiently adsorbed and dispersed on the metal oxide T such as ITO particles. In addition, in a case where the acid value of the polymer dispersant is less than the above-described preferred upper limit value, the number and the molecular size of adsorptive groups can be adjusted to adjust the viscosity of the curable resin composition for a lens to an appropriate range.

A weight-average molecular weight of the above-described polymer dispersant P is not particularly limited, but for example, is preferably 1000 to 30000, and from the viewpoint of further improving the medium- to long-term dispersion stability, more preferably 1000 to 20000, still more preferably 1000 to 15000, and particularly preferably 1000 to 13000. By setting the weight-average molecular weight of the polymer dispersant P to 1000 or more, it is possible to suppress mixing of bubbles generated during curing the curable resin composition for a lens. In addition, by setting the weight-average molecular weight of the polymer dispersant to the above-described preferred upper limit value or less, the fluidity is less likely to decrease even in a case where an amount necessary for dispersing the metal oxide T such as ITO particles is added to the curable resin composition for a lens, and even in a case of forming a cured product having a diffraction grating shape, air gaps are unlikely to occur in a level difference of the mold.

The weight-average molecular weight of the polymer dispersant is a value measured by a method described in Examples described later.

Specific examples of the above-described polymer dispersant P are listed below, the structure thereof is not limited to these. Although the specific examples shown below are all homopolymers, the above-described polymer dispersant P may be a copolymer and may have a constitutional unit other than the constitutional unit represented by General Formula (P). In addition, the specific examples shown below have a structural portion including an acidic group at one terminal, and the other terminal is a methyl group, but a group other than the methyl group may be used. n has the same meaning as n in $L^P$ of General Formula (P) described above.

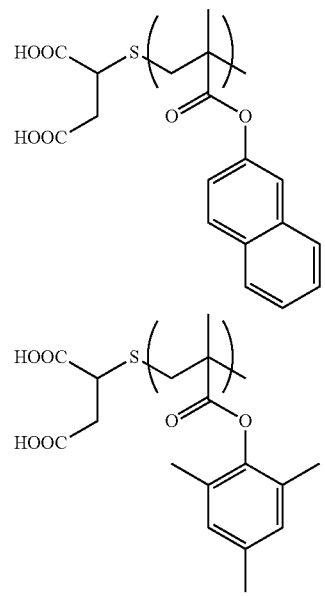

-continued

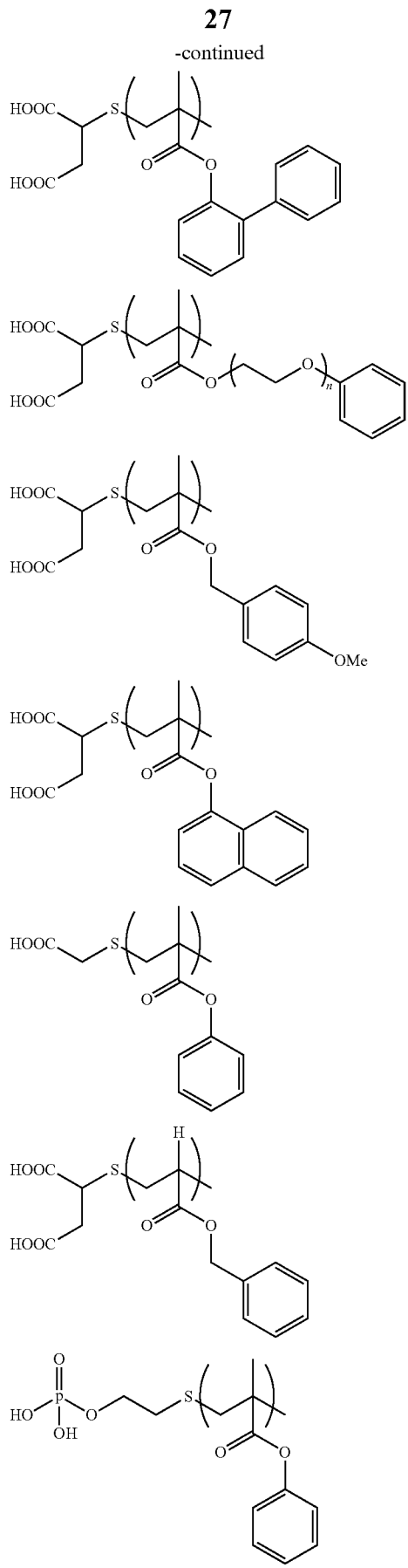

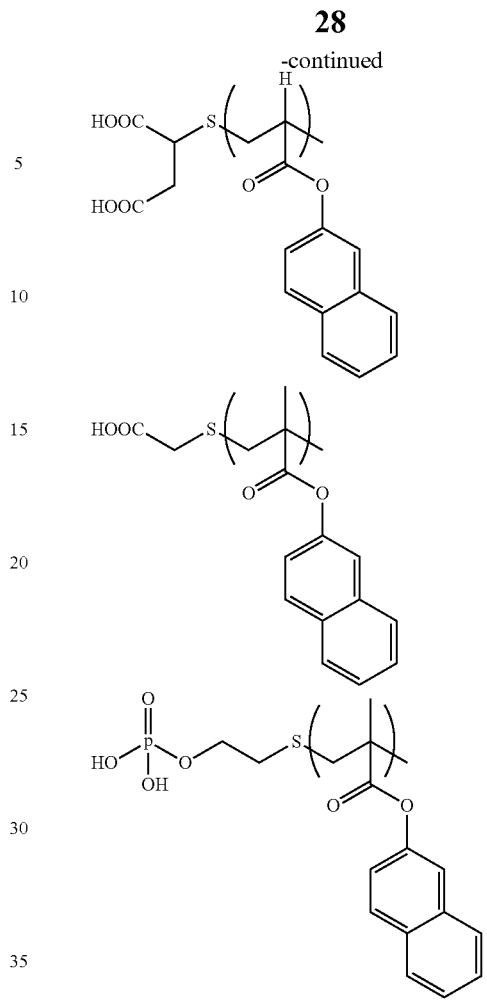

The above-described polymer dispersant P can be produced by a conventional method. For example, the polymer dispersant can be produced by a reaction between a (meth) acrylate monomer and a compound capable of terminating the polymerization reaction of this monomer and having an acidic group (preferably, a carboxyl group). Examples of such compounds include mercaptosuccinic acid, mercaptooxalic acid, and mercaptomalonic acid, and mercaptosuccinic acid is preferable. In addition, with regard to a polymer dispersant having a phosphonooxy group at one terminal, a method described in JP1994-20261A (JP-H6-20261A) can be referred to.

In the curable resin composition for a lens according to the embodiment of the present invention, in a case of containing the polymer dispersant and the above-described metal oxide T, a content of the polymer dispersant is preferably 1 to 50 parts by mass, more preferably 3 to 30 parts by mass, and still more preferably 4 to 30 parts by mass with respect to 100 parts by mass of the content of the metal oxide T. By setting the content ratio to the above-described preferred range, it is possible to suppress the mixing of bubbles generated during curing while stably dispersing the metal oxide T such as ITO particles in the curable resin composition for a lens.

Polymerization Initiator

The curable resin composition for a lens according to the embodiment of the present invention preferably includes, as the polymerization initiator, at least one of a thermal radical polymerization initiator or a photoradical polymerization initiator.

Thermal Radical Polymerization Initiator

The curable resin composition for a lens according to the embodiment of the present invention preferably includes a thermal radical polymerization initiator. By the action of this thermal radical polymerization initiator, a cured product exhibiting high heat resistance can be obtained by thermally polymerizing the curable resin composition for a lens according to the embodiment of the present invention.

As the thermal radical polymerization initiator, a compound usually used as a thermal radical polymerization initiator can be appropriately used according to conditions of a thermopolymerization (heat curing) step described later. Examples thereof include organic peroxides, and specifically, the following compounds can be used.

Examples thereof include 1,1-di(t-hexylperoxy)cyclohexane, 1,1-di(t-butylperoxy) cyclohexane, 2,2-di(4,4-di-(t-butylperoxy)cyclohexyl) propane, t-hexylperoxyisopropyl monocarbonate, t-butylperoxy-3,5,5-trimethylhexanoate, t-butylperoxylaurate, dicumyl peroxide, di-t-butyl peroxide, t-butylperoxy-2-ethylhexanoate, t-hexylperoxy-2-ethylhexanoate, cumene hydroperoxide, t-butyl hydroperoxide, t-butylperoxy-2-ethylhexyl, and 2,3-dimethyl-2,3-diphenylbutane.

In a case of including a thermal radical polymerization initiator, the content of the thermal radical polymerization initiator in the curable resin composition for a lens according to the embodiment of the present invention is preferably 0.01% to 10% by mass, more preferably 0.05% to 5.0% by mass, and still more preferably 0.05% to 2.0% by mass.

(Photoradical Polymerization Initiator)

The curable resin composition for a lens according to the embodiment of the present invention also preferably includes a photoradical polymerization initiator. As the photoradical polymerization initiator, a compound usually used as a photoradical polymerization initiator can be appropriately used according to conditions of a photopolymerization (photocuring) step described later, and specifically, the following compounds can be used.

Examples thereof include bis(2,6-dimethoxybenzoyl)-2,4,4-trimethylpentyl phosphine oxide, bis(2,6-dimethylbenzoyl)-2,4,4-trimethylpentyl phosphine oxide, bis(2,4,6-trimethylbenzoyl)-2,4,4-trimethylpentyl phosphine oxide, bis(2,6-dichlorobenzoyl)-2,4,4-trimethylpentyl phosphine oxide, 1-phenyl-2-hydroxy-2-methylpropan-1-one, 1-hydroxycyclohexylphenylketone, 1-(4-isopropylphenyl)-2-hydroxy-2-methylpropan-1-one, 1,2-diphenylethanedione, methylphenyl glyoxylate, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2,2-dimethoxy-1,2-diphenylethan-1-one, 2-methyl-1-(4-methylthiophenyl)-2-morpholinopropan-1-one, 2-benzyl-2-dimethylamino-1-(4-morpholinophenyl)-butanone-1,2,4,6-trimethylbenzoyl-diphenyl-phosphine oxide, and bis(2,4,6-trimethylbenzoyl)-phenylphosphine oxide.

Among these, in the present invention, as the photoradical polymerization initiator, 1-hydroxycyclohexylphenylketone (for example, available as Irgacure 184 (product name) manufactured by BASF), bis(2,4,6-trimethylbenzoyl)-phenylphosphine oxide (for example, available as Irgacure 819 (product name) manufactured by BASF), 2,2-dimethoxy-1,2-diphenylethan-1-one (for example, available as Irgacure 651 (product name) manufactured by BASF), 1-[4-(2-hydroxyethoxy)-phenyl]-2-hydroxy-2-methyl-1-propan-1-one, or 2-methyl-1-(4-methylthiophenyl)-2-morpholinopropan-1-one can be preferably used.

In a case of including a photoradical polymerization initiator, the content of the photoradical polymerization initiator in the curable resin composition for a lens according to the embodiment of the present invention is preferably 0.01% to 5.0% by mass, more preferably 0.05% to 1.0% by mass, and still more preferably 0.05% to 0.5% by mass.

The curable resin composition for a lens according to the embodiment of the present invention may include both the photoradical polymerization initiator and the thermal radical polymerization initiator. In this case, the total content of the photoradical polymerization initiator and the thermal radical polymerization initiator in the curable resin composition for a lens according to the embodiment of the present invention is preferably 0.01% to 5% by mass, more preferably 0.05% to 1.0% by mass, and still more preferably 0.05% to 0.5% by mass.

Polymer Having Radically Polymerizable Group in Side Chain

The curable resin composition for a lens according to the embodiment of the present invention may include a polymer having a radically polymerizable group in the side chain. As the polymer having a radically polymerizable group in the side chain, for example, the description of the polymer having a radically polymerizable group in the side chain in [0088] to [0095] of WO2019/044863A can be preferably adopted.

Other Additives and the Like

The curable resin composition for a lens according to the embodiment of the present invention may include additives such as a polymer or a monomer other than the above-described components, a dispersant, a plasticizer, a heat stabilizer, a release agent, or the like as long as the gist of the invention is maintained.

Cured Product

The cured product according to an embodiment of the present invention is obtained from the curable resin composition for a lens according to the embodiment of the present invention. The cured product is obtained by polymerizing a polymerizable compound (coloring agent A having a polymerizable group, (meth)acrylate monomer, and the like), but the cured product according to the embodiment of the present invention may include an unreacted monomer.

The cured product obtained by curing the curable resin composition for a lens according to the embodiment of the present invention has high transmittance in the wavelength region from NIR to SWIR, exhibits high wavelength dispersibility in which the wavelength dispersion WD calculated by the above expression (X) is $2.0 \times 10^{-5}$ or more, and has a low refractive index at a wavelength of 656 nm and a low refractive index at a wavelength of 1129 nm, as described later.

For example, in a case where the cured product is formed as a sheet having a thickness of 6 μm, a value of 88% or more can be obtained as a transmittance at a wavelength of 1100 nm, and a value of 30% or more, preferably 40% or more and more preferably 50% or more, can be obtained as a transmittance at a wavelength of 1500 nm. Here, the transmittance means a value measured with a spectrophotometer (for example, a spectrophotometer "UV-3100 (product name)" manufactured by Shimadzu Corporation).

A refractive index $n_C$ of the cured product obtained by curing the curable resin composition for a lens according to the embodiment of the present invention at the wavelength of 656 nm is preferably 1.45 to 1.65 and more preferably 1.47 to 1.62.

A refractive index of the cured product obtained by curing the curable resin composition for a lens according to the embodiment of the present invention at the wavelength of 1129 nm is preferably 1.42 to 1.63 and more preferably 1.45 to 1.60.

The refractive index of the cured product is a value peculiar to the substance, which does not depend on a film thickness, and for example, can be measured by a method described in Examples described later.

Method for Producing Cured Product

The cured product according to the embodiment of the present invention can be produced by a method including at least one of a step of photocuring the curable resin composition for a lens according to the embodiment of the present invention or a step of heat-curing the curable resin composition for a lens according to the embodiment of the present invention. It is preferable that the above-described photoradical polymerization initiator is contained in the curable resin composition in a case of photocuring, or the above-described thermal radical polymerization initiator is contained in the curable resin composition in a case of heat-curing.

As a method for producing the cured product, it is also preferable to include a step of forming a semi-cured product by irradiating the curable resin composition for a lens with light or heating the curable resin composition for a lens; and a step of forming a cured product by irradiating the obtained semi-cured product with light or heating the obtained semi-cured product.

As each of the "step of forming a semi-cured product", the "step of forming a cured product", and the "semi-cured product", the description of the "step of forming a semi-cured product", the "step of forming a cured product", and the "semi-cured product" in [0106] to [0017], [0118] to [0124], and [0125] of WO2019/044863A can be adopted as they are.

Use of Curable Resin Composition for Lens

The curable resin composition for a lens according to the embodiment of the present invention is a curable resin composition used for a lens. Specifically the curable resin composition for a lens according to the embodiment of the present invention is suitable for camera lenses such as a surveillance camera, short-wave infrared imaging lenses for electronic substrate inspection and solar cell inspection, and lens applications which require wavelength dispersibility in the wavelength region from NIR to SWIR, such as a multi-wavelength spectroscopic camera. Among these, the curable resin composition for a lens according to the embodiment of the present invention is preferably used as a material for manufacturing a diffractive optical element, is used as a material for producing a low refractive index and high wavelength dispersibility diffractive optical element in a multilayer diffractive optical element described later, and can provide excellent diffraction efficiency.

Diffractive Optical Element

The diffractive optical element according to an embodiment of the present invention is a diffractive optical element including a surface which has a diffraction grating shape and is formed of the cured product according to the embodiment of the present invention, and is formed by curing the curable resin composition for a lens according to the embodiment of the present invention.

A diffractive optical element formed by curing the curable resin composition for a lens according to the embodiment of the present invention preferably has a maximum thickness of 2 μm to 100 μm. The maximum thickness is more preferably 2 μm to 50 μm and particularly preferably 2 μm to 30 μm. In addition, a level difference (lattice thickness) of the diffraction grating shape (periodic structure) included in the diffractive optical element is preferably 1 μm to 100 μm and more preferably 1 μm to 50 μm. Furthermore, it is sufficient that a pitch of the diffraction grating shape included in the diffractive optical element is in a range of 0.1 mm to 10 mm, and it is preferable that the pitch is changed according to the required optical aberration in the same diffractive optical element.

The diffractive optical element can be produced according to, for example, the following procedure.

The curable resin composition for a lens according to the embodiment of the present invention is sandwiched between a surface of a mold, which is processed into a diffraction grating shape, and a transparent substrate. Thereafter, the curable resin composition for a lens according to the embodiment of the present invention may be pressurized and stretched to a desired range. In the sandwiched state, the curable resin composition for a lens according to the embodiment of the present invention is irradiated with light from the transparent substrate side to cure the curable resin composition. Thereafter, the cured product is released from the mold. After the mold release, the cured product may be further irradiated with light from the side opposite to the transparent substrate side.

Examples of the transparent substrate include a flat glass, and a flat transparent resin (such as (meth)acrylic resin, polycarbonate resin, and polyethylene terephthalate).

The transparent substrate used in the above-described production may be included in the diffractive optical element as it is, or may be peeled off.

The surface of the mold, which is processed into a diffraction grating shape, is preferably a chromium nitride-treated surface. As a result, good mold releasability can be obtained, and the producing efficiency of the diffractive optical element can be improved.

Examples of the chromium nitride treatment include a method for forming a chromium nitride film on the mold surface. As the method for forming a chromium nitride film on the mold surface, a chemical vapor deposition (CVD) method and a physical vapor deposition (PVD) method can be exemplified. The CVD method is a method in which a raw material gas including chromium and a raw material gas including nitrogen are reacted at a high temperature to form a chromium nitride film on a surface of a base substance. In addition, the PVD method is a method (arc-type vacuum vapor deposition method) for forming a chromium nitride film on a surface of a base substance using arc discharge. The arc-type vacuum vapor deposition method is a method for forming a film of a compound by reacting ionized metals with a reaction gas on the surface of the base substance. Specifically, a cathode (evaporation source) formed with, for example, chrome in a vacuum container, is disposed, arc discharge occurs between the cathode and a wall surface of the vacuum container through a trigger, ionization of metal by arc plasma is performed at the same time of evaporating the cathode, a negative voltage is applied to the base substance, and a reaction gas (for example, nitrogen gas) is introduced into the vacuum container at approximately several tens mTorr (1.33 Pa).

As the light used for the light irradiation curing the curable resin composition for a lens according to the embodiment of the present invention, ultraviolet light or visible light preferable and ultraviolet light is more preferable. For example, a metal halide lamp, a low pressure mercury lamp, a high pressure mercury lamp, an ultra-high pressure mercury lamp, a germicidal lamp, a xenon lamp, a light emitting diode (LED) light source lamp, and the like are suitably used. The illuminance of ultraviolet light used for the light irradiation curing the curable resin composition for a lens according to the embodiment of the present invention is preferably 1 to 100 mW/cm$^2$, more preferably 1 to 75 mW/cm$^2$, and still more preferably 5 to 50 mW/cm$^2$. The curable resin composition may be irradiated with ultraviolet light having different illuminance multiple times. The exposure amount of ultraviolet light is preferably 0.4 to 10 J/cm$^2$, more preferably 0.5 to 5 J/cm$^2$, and still more preferably 1 to 3 J/cm$^2$. The atmosphere during the light irradiation is preferably an atmosphere replaced with air or an inert gas, and more preferably an atmosphere in which air is replaced with nitrogen until the oxygen concentration is 1% or less.

Multilayer Diffractive Optical Element

The multilayer diffractive optical element according to an embodiment of the present invention includes a first diffractive optical element and a second diffractive optical element, in which the first diffractive optical element is a diffractive optical element formed of the cured product according to the embodiment of the present invention, and the surface of the first diffractive optical element, which has a diffraction grating shape, and a surface of the second diffractive optical element, which has a diffraction grating shape, face each other. It is preferable that the surfaces having the diffraction grating shapes are in contact with each other.

It is preferable that a multilayer diffractive optical element is formed by including, as a first diffractive optical element, the diffractive optical element formed by curing the curable resin composition for a lens according to the embodiment of the present invention, and further overlapping a second diffractive optical element formed of a different material such that the first diffractive optical element and the second diffractive optical element face each other in lattice-shaped surfaces. In this case, it is preferable that the lattice-shaped surfaces are in contact with each other.

By forming the second diffractive optical element with a material having a higher refractive index and lower wavelength dispersibility than the first diffractive optical element, it is possible to suppress the occurrence of flare, and the like, and sufficiently utilize a chromatic aberration reducing effect of the multilayer diffractive optical element.

The refractive index of the second diffractive optical element at the wavelength of 656 nm is preferably 1.55 to 1.70 and more preferably 1.58 to 1.68. In addition, the refractive index of the second diffractive optical element at the wavelength of 656 nm is larger than the refractive index of the first diffractive optical element simultaneously used in the multilayer diffractive optical element, that is, it is satisfied that the refractive index of the second diffractive optical element at the wavelength of 656 nm>the refractive index of the first diffractive optical element at the wavelength of 656 nm.

The refractive index of the second diffractive optical element at the wavelength of 1129 nm is preferably 1.55 to 1.70 and more preferably 1.58 to 1.68. In addition, the refractive index of the second diffractive optical element at the wavelength of 1129 nm is larger than the refractive index of the first diffractive optical element simultaneously used in the multilayer diffractive optical element, that is, it is satisfied that the refractive index of the second diffractive optical element at the wavelength of 1129 nm>the refractive index of the first diffractive optical element at the wavelength of 1129 nm.

The material for forming the second diffractive optical element is not particularly limited as long as a cured product having a high refractive index and a low wavelength dispersibility is obtained. For example, a curable resin composition for a lens, which includes a (meth)acrylate monomer compound having a sulfur atom, a halogen atom, or an aromatic ring structure, a curable resin composition for a lens, which includes zirconium oxide and a (meth)acrylate monomer compound, and the like can be used.

The multilayer diffractive optical element can be produced according to, for example, the following procedure.

A material for forming the second diffractive optical element is sandwiched between a diffraction grating shape surface (surface obtained after the mold release) of a diffractive optical element formed by curing the curable resin composition for a lens according to the embodiment of the present invention, and a transparent substrate. Thereafter, the material may be pressurized and stretched to a desired range. In the sandwiched state, the material is irradiated with light from the transparent substrate side to cure the material. Thereafter, the cured product is released from the mold.

That is, as the multilayer diffractive optical element according to the embodiment of the present invention, it is preferable that the first diffractive optical element, the second diffractive optical element, and the transparent substrate are arranged in this order.

Examples of the transparent substrate include the same examples as the transparent substrate used in a case of producing the diffractive optical element (first diffractive optical element).

The transparent substrate used in the above-described production may be included in the multilayer diffractive optical element as it is, or may be peeled off.

The multilayer diffractive optical element preferably has a high diffraction efficiency. For example, the diffraction efficiency of the multilayer diffractive optical element with the primary light at the wavelength of 656 nm is preferably 50% or more, more preferably 80% or more, still more preferably 85% or more, and particularly preferably 95% or more. In addition, the diffraction efficiency of the multilayer diffractive optical element with the primary light at the wavelength of 1129 nm is preferably 90% or more and more preferably 95% or more.

In a case where the diffraction efficiency of the multilayer diffractive optical element with the primary light exhibits high diffraction efficiency at the above-described wavelengths of 656 nm and 1129 nm, unnecessary diffracted light can be sufficiently suppressed, and a high-performance lens can be realized.

The multilayer diffractive optical element preferably has a maximum thickness of 50 μm to 20 mm. The maximum thickness is more preferably 50 μm to 10 mm and particularly preferably 50 μm to 3 mm.

Lens

The above-described diffractive optical element and multilayer diffractive optical element can be used as a lens, respectively.

A film or a member can be provided on the surface or the periphery of the lens depending on the environment in which the lens is used or the use of the lens. For example, a protective film, an anti-reflection film, a hard coat film, and the like can be formed on the surface of the lens. In addition, the lens can be used as a composite lens in which a glass lens or a plastic lens is laminated on the lens. Furthermore, the periphery of the lens can be fitted into a base material holding frame or the like, and fixed. However, these films, frames, and the like are members added to the lens, and are distinguished from the lens itself in the present specification.

The lens is preferably used as an image pick-up lens in a mobile phone, a digital camera, and the like, an imaging lens in a television, a video camera, and the like, and an in-vehicle lens.

EXAMPLES

Hereinafter, the present invention will be described in more detail based on Examples. The materials, amounts used, proportions, treatment details, treatment procedures, and the like described in the following examples can be appropriately modified as long as the gist of the invention is maintained. Therefore, the scope of the present invention should not be construed as being limited to the following specific examples.

Synthesis Example

1. Synthesis of ITO Particles
(1) Synthesis of ITO Particles (ITO-1)

75 ml of oleic acid (manufactured by Sigma-Aldrich, Inc., technical grade, 90%), 10.060 g (34.5 mmol) of indium acetate (manufactured by Alfa Aesar, 99.99%), and 1.079 g (3.0 mmol) of tin (IV) acetate (manufactured by Alfa Aesar) were added in a flask. The mixture in the flask was heated at 160° C. for 1 hour under an environment of nitrogen flow to obtain a yellow transparent precursor solution.

Subsequently, 90 ml of oleyl alcohol (manufactured by FUJIFILM Wako Pure Chemical Corporation (formerly manufactured by WAKO CHEMICAL CO., LTD.), standard content: 65% or more) was charged into another flask, and heated at 290° C. in a nitrogen flow. Using a syringe pump, the precursor solution was added dropwise to the heated oleyl alcohol at a rate of 1.75 mL/min. After the completion of the dropwise addition of the precursor solution, the obtained reaction solution was retained at 290° C. for 120 minutes, and thereafter, the heating was stopped and the reaction solution was cooled to room temperature.

After adding ethanol to the obtained reaction solution, centrifugation was performed to precipitate particles. The removal of the supernatant and the redispersion of the particles in toluene were repeated 3 times to obtain a toluene dispersion liquid of ITO particles (ITO-1) coordinated with oleic acid. The concentration of solid contents in the dispersion liquid was a total 5% by mass, 4.75% by mass of ITO solid content and 0.25% by mass of solid content of a surface treatment component.

In a case where the above-descried ITO particles (ITO-1) were observed by TEM (product name: JFM-ARM300F2 GRAND, manufactured by JEOL Ltd.), the average primary particle diameter was 28.5 nm. Specifically, the measurement was performed based on the above-described method for measuring the average primary particle diameter of ITO particles.

In a case where the above-described toluene dispersion liquid was diluted to 200× with toluene and spectroscopic measurement was performed using UV-3100 (product name, manufactured by Shimadzu Corporation), the maximal absorption wavelength was 1750 nm.

(2) Synthesis of ITO Particles (ITO-2)

75 ml of oleic acid (manufactured by Sigma-Aldrich, Inc., technical grade, 90%), 10.62 g (36.4 mmol) of indium acetate (manufactured by Alfa Aesar, 99.99%), and 0.400 g (1.1 mmol) of tin (IV) acetate (manufactured by Alfa Aesar) were added in a flask. The mixture in the flask was heated at 160° C. for 1 hour under an environment of nitrogen flow to obtain a yellow transparent precursor solution.

Subsequently, 90 ml of oleyl alcohol (manufactured by FUJIFILM Wako Pure Chemical Corporation, standard content: 65% or more) was charged into another flask, and heated at 285° C. in a nitrogen flow. Using a syringe pump, the precursor solution was added dropwise to the heated oleyl alcohol at a rate of 0.70 mL/min. After the completion of the dropwise addition of the precursor solution, the obtained reaction solution was retained at 285° C. for 30 minutes, and thereafter, the heating was stopped and the reaction solution was cooled to room temperature.

After adding ethanol to the obtained reaction solution, centrifugation was performed to precipitate particles. The removal of the supernatant and the redispersion of the particles in toluene were repeated 3 times to obtain a toluene dispersion liquid of ITO particles (ITO-2) coordinated with oleic acid. The concentration of solid contents in the dispersion liquid was a total 5% by mass, 4.75% by mass of ITO solid content and 0.25% by mass of solid content of a surface treatment component.

In a case where the above-descried ITO particles (ITO-2) were observed by TEM (product name: JFM-ARM300F2 GRAND, manufactured by JEOL Ltd.), the average primary particle diameter was 25 nm. Specifically, the measurement was performed based on the above-described method for measuring the average primary particle diameter of ITO particles.

In a case where the above-described toluene dispersion liquid was diluted to 200× with toluene and spectroscopic measurement was performed using UV-3100 (product name, manufactured by Shimadzu Corporation), the maximal absorption wavelength was 2350 nm.

2. Synthesis of Polymer Dispersant
Polymer Dispersant (P-1)

10.8 g of benzyl methacrylate (manufactured by FUJIFILM Wako Pure Chemical Corporation), 9.2 g of t-butyl methacrylate (manufactured by FUJIFILM Wako Pure Chemical Corporation), and 0.95 g of mercapto succinic acid (manufactured by FUJIFILM Wako Pure Chemical Corporation) were dissolved in 23 mL of methyl ethyl ketone and heated to 70° C. under a nitrogen stream. The solution was added dropwise over 30 minutes to a solution in which 0.20 g of a polymerization initiator (manufactured by FUJIFILM Wako Pure Chemical Corporation, product name: V-65) was dissolved in 9 mL of methyl ethyl ketone. After the completion of the dropwise addition, the reaction was further performed at 70° C. for 4.5 hours. After allowing to cool, the reaction solution was added dropwise to a cooled mixed solution of 200 mL of water and 600 mL of methanol, and the precipitated powdery substance was collected by filtration and dried to obtain 17 g of a polymer dispersant (P-1) having a carboxy group as an acidic group at one terminal. The polymer dispersant (P-1) was substantially composed of a polymer having a carboxy group at one terminal.

The weight-average molecular weight of the obtained polymer was 5900 in terms of standard polystyrene according to a gel permeation chromatography (GPC) method, and the dispersity (Mw/Mn; Mn: number-average molecular weight) was 1.70. In addition, in a case where the number in mg of potassium hydroxide required to neutralize free fatty acid present in 1 g of the obtained polymer was measured to obtain an acid value, the acid value was 20 mgKOH/g.

Measurement Condition
    Measuring instrument: HLC-8320GPC (product name, manufactured by Tosoh Corporation)
    Column: connection of TOSOH TSKgel Super HZM-H (product name, manufactured by Tosoh Corporation), TOSOH TSKgel Super HZ4000 (product name, manufactured by Tosoh Corporation), and TOSOH TSKgel Super HZ2000 (product name, manufactured by Tosoh Corporation)

Carrier: THF
Measurement temperature: 40° C.
Carrier flow rate: 0.35 ml/min
Sample concentration: 0.1%
Detector: refractive index (RI) detector

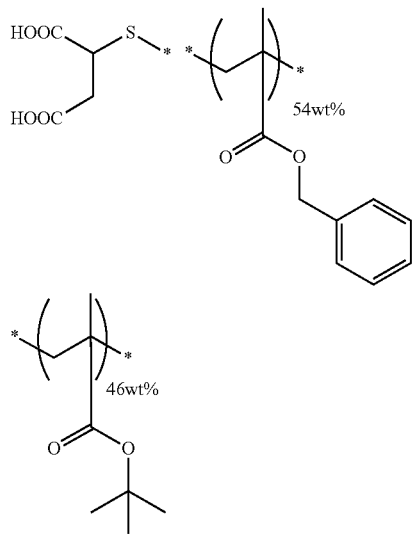

P-1

Example

1. Preparation of Curable Resin Composition for Lens
(1) Preparation of Curable Resin Compositions Nos. 101 to 106, 108 to 111, c02, and c03 for Lens A coloring agent, a monomer component, and a photopolymerization initiator were mixed so as to have composition described in the tables below, and stirred homogeneously, thereby preparing curable resin compositions Nos. 101 to 106, 108 to 111, c02, and c03 for a lens.

(2) Preparation of Curable Resin Composition No. 107 for Lens 0.075 g of a tetraazaporphyrin coloring agent TAP-1 described later, 0.052 g of a polymer dispersant (P-1), and 0.609 g of 1,6-hexanediol dimethacrylate (hereinafter, abbreviated as "HDDMA", manufactured by FUJIFILM Wako Pure Chemical Corporation) were added to 5.2 g of the toluene dispersion liquid of ITO-2 (solid content: 0.26 g) and dissolved. Toluene was distilled off by suction under reduced pressure while heating in a water bath at approximately 70° C. After the distillation, 0.004 g of IRGACURE 819 (product name, manufactured by BASF) was added to the obtained mixture and dissolved, thereby preparing a curable resin composition No. 107 for a lens.

(3) Preparation of Curable Resin Composition No. c01 for Lens 0.30 g of a near-ultraviolet light-absorbing organic compound I-1 described later, 0.052 g of a polymer dispersant (P-1), and 0.384 g of HDDMA (manufactured by FUJIFILM Wako Pure Chemical Corporation) were added to 5.2 g of the toluene dispersion liquid of ITO-1 (solid content: 0.26 g) and dissolved. Toluene was distilled off by suction under reduced pressure while heating in a water bath at approximately 70° C. After the distillation, 0.004 g of IRGACURE 819 (product name, manufactured by BASF) was added to the obtained mixture and dissolved, thereby preparing a curable resin composition No. c01 for a lens.

Evaluation 1: Measurement of Optical Characteristics
(1) Production of Cured Product 15 mg of the curable resin composition for a lens prepared above was placed on a mirror-treated SUS plate, sandwiched between hydrophobically treated glass plates, irradiated with UV under the conditions of integrated light intensity of 1.0 J/cm² and illuminance of 30 mW/cm² using a UV irradiation device (EXECURE 3000 (product name), manufactured by HOYA CANDEO OPTRONICS CORPORATION), and irradiated with UV under the conditions of integrated light intensity of 1.0 J/cm² and illuminance of 5 mW/cm² to produce a cured product. The film thickness of the cured product obtained as described above was 10 to 20 μm.

(2) Measurement of Refractive Index and WD

Using the cured product produced under the above conditions, refractive index at wavelengths of 656 nm and 1129 nm was measured with a multi-wavelength Abbe refractometer DR-M2 (product name, manufactured by ATAGO CO., LTD.), and the wavelength dispersion WD was calculated by the following expression (X), and evaluated by the following standard. In this test, evaluation ranks "A1" to "C" are an acceptable level.

$$WD = (nC - n(1129))/(1129 - 656)$$  Expression (X)

In the expression, nC represents a refractive index at a wavelength of 656 nm and n(1129) represents a refractive index at a wavelength of 1129 nm.

All of the cured products produced under the above conditions had a refractive index nC of 1.47 to 1.60 at a wavelength of 656 nm.

—Evaluation Standard of Wavelength Dispersion WD—
A1: $7.0 \times 10^{-5}$ or more
A2: $5.0 \times 10^{-5}$ or more and less than $7.0 \times 10^{-5}$
B: $3.0 \times 10^{-5}$ or more and less than $5.0 \times 10^{-5}$
C: $2.0 \times 10^{-5}$ or more and less than $3.0 \times 10^{-5}$
D: less than $2.0 \times 10^{-5}$
E: it could not be evaluated due to coloration of the cured product.

Evaluation 2: Light Resistance Test
(1) Production of Cured Product Sample for Light Resistance Test 0.8 μL of the curable resin composition for a lens prepared above was placed on a 2.5 cm×2.5 cm glass plate, the glass plate was sandwiched between glass plates of the same size to prevent air bubbles from being mixed, and the curable composition was spread over the entire surface of the glass plate. At this time, a thickness was adjusted so that an absorbance Abs1 measured in (2) below was 1.7 to 2.0.

In an atmosphere with an oxygen concentration of 1% or less, using EXECURE 3000 (product name, manufactured by HOYA CORPORATION) as an UV irradiation device, a cured product sanded on a glass plate (cured product sample for light resistance test) was obtained by irradiating with ultraviolet rays of 2 J/cm².

(2) Absorbance Measurement and Light Resistance Test

With regard to the cured product sample prepared above, using a spectrophotometer UV-2600 (product name, manufactured by Shimadzu Corporation), an absorbance in a wavelength range of 200 to 800 nm was measured for each 1 nm, and an absorbance Abs1 at λmax was determined. Thereafter, using a xenon accelerated weather fastness tester Q-SUN Xe-1 (product name, manufactured by Q-Lab Corporation, light source: xenon arc lamp), the cured product sample was irradiated for 24 hours under the condition of illuminance of 0.4 W/m² (340 nm), an absorbance was measured in the same manner as above, and an absorbance Abs2 at λmax was measured.

In the above, λmax means a wavelength showing the largest absorbance among wavelengths showing the maximal absorption, and λmax in the tables below is also synonymous.

B2: rate of decrease in absorbance (ΔAbs) was 20% or more and less than 25%.

C: rate of decrease in absorbance (ΔAbs) was 25% or more and less than 30%.

D: rate of decrease in absorbance (ΔAbs) was 30% or more and less than 40%.

E: rate of decrease in absorbance (ΔAbs) was 40% or more.

TABLE 1-1

| Curable resin composition No. for lens | | 101 | 102 | 103 | 104 | 105 | 106 | 107 |
|---|---|---|---|---|---|---|---|---|
| Coloring agent | Type | FDG-003 | TAP-1 | TAP-1 | TAP-1 | TAP-1 | TAP-2 | TAP-1 |
| | λmax | 547 nm | 594 nm | 594 nm | 594 nm | 594 nm | 583 nm | 594 nm |
| | Blending amount | 10 wt % | 10 wt % | 10 wt % | 10 wt % | 10 wt % | 10 wt % | 7.5 wt % |
| Monomer component | BnMA | 89.6 wt % | 89.6 wt % | — | — | — | — | — |
| | DCP | — | — | 89.6 wt % | — | — | — | — |
| | HDDMA | — | — | — | 89.6 wt % | — | 89.6 wt % | 60.9 wt % |
| | FA-513AS | — | — | — | — | 89.6 wt % | — | — |
| Metal oxide | ITO-1 (maximal absorption at 1750 nm) | — | — | — | — | — | — | — |
| | ITO-2 (maximal absorption at 2350 nm) | — | — | — | — | — | — | 26 wt % |
| Polymer dispersant | P-1 | — | — | — | — | — | — | 5.2 wt % |
| Photopolymerization initiator | Irg819 | 0.4 wt % | 0.4 wt % | 0.4 wt % | 0.4 wt % | 0.4 wt % | 0.4 wt % | 0.4 wt % |
| Evaluation | Wavelength dispersion WD | B | A2 | A2 | A2 | A2 | A2 | A1 |
| | Light resistance | C | C | A1 | A1 | A1 | A1 | A1 |

TABLE 1-2

| Curable resin composition No. for lens | | 108 | 109 | 110 | 111 | c01 | c02 | c03 |
|---|---|---|---|---|---|---|---|---|
| Coloring agent | Type | TAP-1 | TAP-1 | TAP-1 | FDG-003 | I-1 | I-1 | TAP-1 |
| | λmax | 594 nm | 594 nm | 594 nm | 547 nm | 374 nm | 374 nm | 594 nm |
| | Blending amount | 20 wt % | 5 wt % | 3 wt % | 10 wt % | 30 wt % | 30 wt % | 0.1 wt % |
| Monomer component | BnMA | — | — | — | — | — | — | — |
| | DCP | — | — | — | — | — | — | — |
| | HDDMA | 79.6 wt % | 94.6 wt % | 96.6 wt % | 89.6 wt % | 38.4 wt % | 69.6 wt % | 99.5 wt % |
| | FA-513AS | — | — | — | — | — | — | — |
| Metal oxide | ITO-1 (maximal absorption at 1750 nm) | — | — | — | — | 26 wt % | — | — |
| | ITO-2 (maximal absorption at 2350 nm) | — | — | — | — | — | — | — |
| Polymer dispersant | P-1 | — | — | — | — | 5.2 wt % | — | — |
| Photopolymerization initiator | Irgacure 819 | 0.4 wt % | 0.4 wt % | 0.4 wt % | 0.4 wt % | 0.4 wt % | 0.4 wt % | 0.4 wt % |
| Evaluation | Wavelength dispersion WD | A1 | B | C | B | E | D | D |
| | Light resistance | A1 | A1 | A1 | B2 | E | E | A1 |

A rate of decrease in absorbance (ΔAbs) before and after the light irradiation test was calculated according to the following expression, and the light resistance was evaluated based on the following standard. In this test, evaluation ranks "A1" to "C" are acceptable.

$$\Delta Abs = (Abs1 - Abs2)/Abs1 \times 100$$

—Evaluation of Light Resistance—

A1: rate of decrease in absorbance (ΔAbs) was less than 10%.

A2: rate of decrease in absorbance (ΔAbs) was 10% or more and less than 15%.

B1: rate of decrease in absorbance (ΔAbs) was 15% or more and less than 20%.

Note to Table

Each component in the tables is as follows.

The description of "—" in each component means that the corresponding component is not contained. In addition, "wt %" means % by mass, and the blending amount of ITO particles means the amount of solid content in the ITO particle dispersion liquid.

Coloring Agent

FDG-003: product name, manufactured by YAMADA CHEMICAL CO., LTD., merocyanine coloring agent TAP-1 and TAP-2: tetraazaporphyrin coloring agents TAP-1 and TAP-2 described below, respectively; TAP-1 was synthesized by methods described in Examples 4 and 10 of JP2012-121821A, and TAP-2 was synthesized in the same manner as described in Examples 4 and 10 of JP2012-121821A, except that cuprous chloride was changed to palladium chloride.

I-1: near-ultraviolet light-absorbing organic compound I-1 described below; the near-ultraviolet light-absorbing organic compound I-1 was synthesized in the same manner as in <Synthesis of compound (I-4)> described in Examples of WO2020/171197A, except that 2-hydroxyethyl acrylate was used instead of the compound (I-4a).

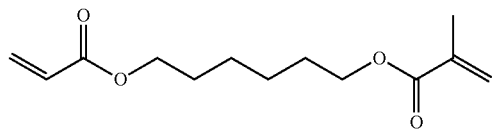

HDDMA

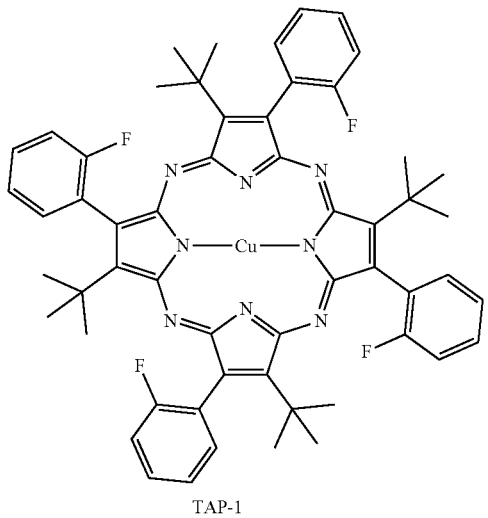

TAP-1

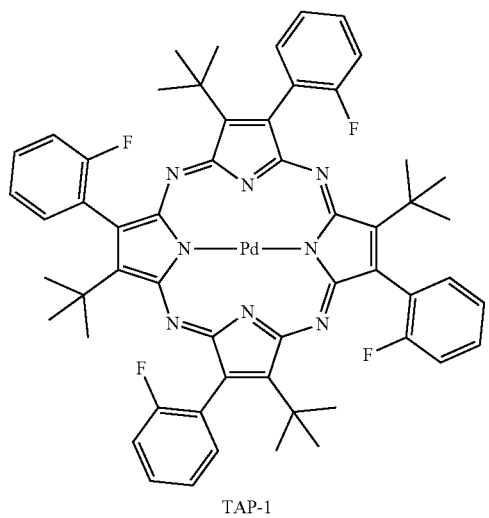

TAP-1

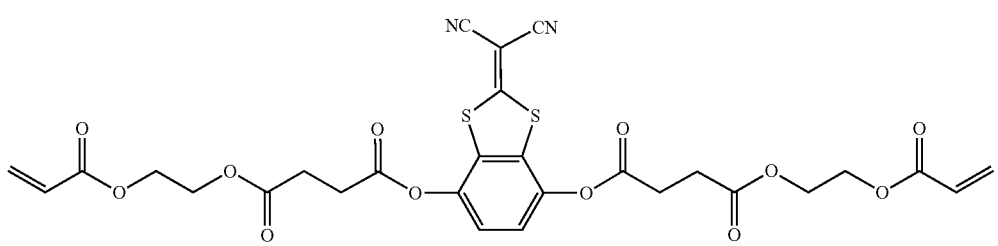

I-1

Monomer Component

FA-513AS: product name, manufactured by SHOWA DENKO K.K.Tg described together in the following structure is Tg of the corresponding homopolymer measured by the above-described method.

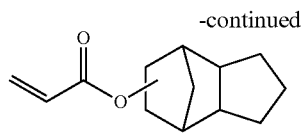

FA-513AS Tg120° C.

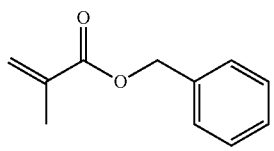

BnMA Tg54° C.

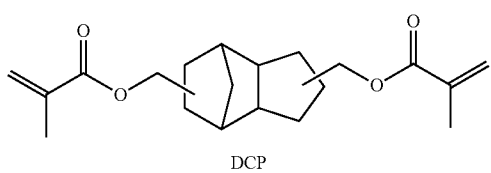

DCP

Metal Oxide

ITO-1 and ITO-2: toluene dispersion liquids of ITO-1 and ITO-2 produced above, respectively Polymer Dispersant P-1: polymer dispersant (P-1) (photopolymerization initiator) produced above Irgacure 819: product name, manufactured by BASF

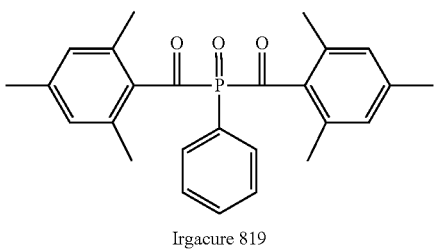

Irgacure 819

From the results shown in Table 1, the following is found.

The comparative curable resin compositions Nos. c01 and c02 for a lens are not the curable resin composition for a lens according to the embodiment of the present invention in that they do not contain a coloring agent having a maximal absorption at a wavelength of 520 to 620 nm. The cured product obtained from the comparative curable resin composition No. c01 for a lens is a cured product which imitates the cured product disclosed in WO2020/171197A, and in the cured product obtained from the comparative curable resin composition No. c01 for a lens, the wavelength dispersion WD calculated from the expression (X) cannot be evaluated, and both wavelength dispersion characteristics in the wavelength region from NIR to SWIR and light resistance are inferior. In addition, even in the comparative curable resin composition No. c02 for a lens, which is adjusted so as not to contain ITO with respect to the comparative curable resin composition No. c01 for a lens, the wavelength dispersion WD calculated from the expression (X) is still less than $2.0 \times 10^{-5}$, and both wavelength dispersion WD and light resistance are inferior. In addition, even in a case where the coloring concentration is adjusted to be higher than that of the comparative curable resin composition No. c02 for a lens, the wavelength dispersion WD is not improved to a level of $2.0 \times 10^{-5}$ or more.

In contrast to these, in the curable resin compositions Nos. 101 to 111 for a lens according to the embodiment of the present invention, which contains the polymer dispersant specified in the present invention, the obtained cured product has a wavelength dispersion WD, which is calculated from the expression (X), at a level of $2.0 \times 10^{-5}$ or more, has excellent wavelength dispersion characteristics in the wavelength region from NIR to SWIR, and has excellent light resistance. From the comparison between the cured product obtained from the curable resin compositions Nos. 104, and 108 to 110 for a lens according to the embodiment of the present invention and the cured product obtained from the comparative curable resin composition No. c03 for a lens, it can be seen that the wavelength dispersion characteristics in the wavelength region from NIR to SWIR can be controlled by appropriately controlling the content of the coloring agent having a maximal absorption at a wavelength of 520 to 620 nm.

Among these, in a case of containing the tetraazaporphyrin coloring agent as the coloring agent having a maximal absorption at a wavelength of 520 to 620 nm, it can be seen that the wavelength dispersion WD calculated from the expression (X) is improved (No. 101 with respect to No. 102). In addition, in a case of using a curable resin composition for a lens containing, as the coloring agent having a maximal absorption at a wavelength of 520 to 620 nm, the tetraazaporphyrin coloring agent, and containing, as a component constituting the resin in the cured product, a bifunctional or higher (meth)acrylate monomer or a monofunctional (meth)acrylate monomer in which Tg of a homopolymer is 100° C., it can be seen that the light resistance is improved (comparison of No. 111 with respect to No. 101 and comparison of Nos. 103 to 105 with respect to No. 102). In addition, in a case of using ITO in combination, it can be seen that it is possible to exhibit excellent wavelength dispersion characteristics in the wavelength region from NIR to SWIR while keeping the concentration of the coloring agent having a maximal absorption at a wavelength of 520 to 620 nm (refer to Nos. 107 and 108).

Evaluation 3: Measurement of Transmittance (1) Production of Cured Product Sample for Transmittance Measurement The curable resin composition for a lens prepared above was sandwiched between hydrophobically treated glass plates to prevent air bubbles from mixing, irradiated with UV under the conditions of integrated light intensity of 1.0 J/cm² and illuminance of 30 mW/cm² using a UV irradiation device (EXECURE 3000 (product name), manufactured by HOYA CANDEO OPTRONICS CORPORATION), and irradiated with UV under the conditions of integrated light intensity of 1.0 J/cm² and illuminance of 5 mW/cm² to produce a cured product (cured product sample for transmittance measurement). The film thickness of the cured product obtained as described above was 6 μm.

(2) Measurement of Transmittance

With regard to the cured product sample produced under the above-described conditions, using a spectrophotometer UV-3100 (product name, manufactured by Shimadzu Corporation), a transmittance at a wavelength of 200 to 2100 nm was measured. Among the curable resin compositions for a lens, transmittances at 1100 nm and 1500 nm of No. 107 and c01 containing ITO are summarized in Table 2.

TABLE 2

| Curable resin composition No. for lens | 107 | c01 |
|---|---|---|
| Transmittance at 1100 nm | 88% | 60% |
| Transmittance at 1500 nm | 55% | 0% |

The cured product obtained from the comparative curable resin composition No. c01 for a lens has low and inferior transmittances at both 1100 nm and 1500 nm. On the other hand, the cured product obtained from the curable resin composition No. 107 for a lens according to the embodiment of the present invention has high transmittances at both 1100 nm and 1500 nm, and satisfies the transmittance characteristics required for a lens applied to the wavelength region from NIR to SWIR. The cured products obtained from the curable resin compositions Nos. 101 to 106 and 108 to 111 for a lens according to the embodiment of the present invention exhibit transmittances derived from the resin component constituting the cured product, and all exhibit higher transmittance than that of the cured product obtained from the curable resin composition No. 107 for a lens according to the embodiment of the present invention, and satisfy the transmittance characteristics required for a lens applied to the wavelength region from NIR to SWIR.

What is claimed is:

1. A curable resin composition for a lens, comprising:
a coloring agent A having a maximal absorption at a wavelength of 520 to 620 nm,
wherein a wavelength dispersion WD of a cured product of the composition, which is calculated by the following expression (X), is $2.0 \times 10^0$ or more, $$WD = (nC - n(1129))/(1129 - 656)$$  Expression (X)

in the expression, nC represents a refractive index at a wavelength of 656 nm and n(1129) represents a refractive index at a wavelength of 1129 nm, wherein a content of the coloring agent A in the curable resin composition for a lens is 15% by mass or more, or the curable resin composition for a lens includes a metal oxide having a maximal absorption at a wavelength of 1900 to 4000 nm.

2. The curable resin composition for a lens according to claim 1, wherein the coloring agent A is a tetraazaporphyrin coloring agent.

3. The curable resin composition for a lens according to claim 2, wherein the coloring agent A is a compound represented by General Formula (a),

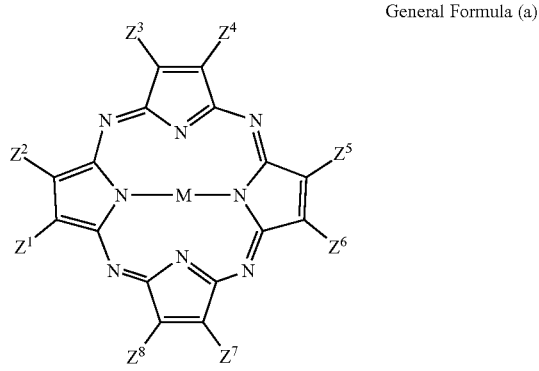

General Formula (a)

in the formula, M represents Pd, Cu, Ni, Co, or V(=O), and in each combination of $Z^1$ and $Z^2$, $Z^3$ and $Z^4$, $Z^5$ and $Z^6$, and $Z^7$ and $Z^8$ of $Z^1$ to $Z^8$, one group constituting the combination is a substituted phenyl group and the other group is a hydrocarbon group having 1 to 6 carbon atoms.

4. The curable resin composition for a lens according to claim 1, further comprising:

at least one of a polyfunctional (meth)acrylate monomer or a monofunctional (meth)acrylate monomer, wherein, in a case where the monofunctional (meth) acrylate monomer is a homopolymer, a glass transition temperature is 100° C. or higher.

5. A cured product of the curable resin composition for a lens according to claim 1.

6. A diffractive optical element comprising:

the cured product according to claim 5, wherein the diffractive optical element includes a surface having a diffraction grating shape and formed of the cured product.

7. A multilayer diffractive optical element comprising:

a first diffractive optical element; and a second diffractive optical element, wherein the first diffractive optical element is the diffractive optical element according to claim 6, and the surface of the first diffractive optical element, which has a diffraction grating shape, and a surface of the second diffractive optical element, which has a diffraction grating shape, face each other.

* * * * *